(12) United States Patent
Strothmann et al.

(10) Patent No.: US 6,794,836 B2
(45) Date of Patent: Sep. 21, 2004

(54) ELECTRIC MOTOR DRIVE CONTROLLER WITH VOLTAGE CONTROL CIRCUIT OPERATIVE IN DIFFERENT MODES

(75) Inventors: Thomas Strothmann, Wallenhorst (DE); Joseph B. Richey, Chagrin Falls, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 10/255,253

(22) Filed: Sep. 26, 2002

(65) Prior Publication Data
US 2003/0111972 A1 Jun. 19, 2003

Related U.S. Application Data

(63) Continuation-in-part of application No. 10/068,391, filed on Feb. 6, 2002, now abandoned.
(60) Provisional application No. 60/354,765, filed on Feb. 6, 2002, and provisional application No. 60/266,736, filed on Feb. 6, 2001.
(51) Int. Cl.[7] .................................................. H02P 1/00
(52) U.S. Cl. ....................... 318/268; 318/254; 318/138; 318/439
(58) Field of Search ................................. 318/268, 254, 318/138, 439, 139, 434, 432, 638, 599, 108, 812, 442, 504, 648; 363/71

(56) References Cited

U.S. PATENT DOCUMENTS

| 4,415,959 | A | | 11/1983 | Vinciarelli |
|---|---|---|---|---|
| 4,441,146 | A | | 4/1984 | Vinciarelli |
| 4,648,020 | A | | 3/1987 | Vinciarelli |
| 4,675,797 | A | | 6/1987 | Vinciarelli |
| 5,889,723 | A | * | 3/1999 | Pascucci ...................... 365/229 |
| 6,051,942 | A | * | 4/2000 | French ........................ 318/254 |
| 6,208,099 | B1 | * | 3/2001 | Kwon ......................... 318/432 |
| 6,295,215 | B1 | * | 9/2001 | Faria et al. .................... 363/37 |
| 6,417,642 | B2 | * | 7/2002 | Ichikawa ..................... 318/638 |

OTHER PUBLICATIONS

Creating High Voltage Outputs, Vicor Corporation; pp. 1–4; Jun. 2000.

Vicor Topology, p. 1; Feb. 1, 2002.

* cited by examiner

*Primary Examiner*—Karen Masih
(74) *Attorney, Agent, or Firm*—Nenad Pejic; Calfee, Halter & Griswold

(57) ABSTRACT

An electric motor drive controller for an electric vehicle driven by a motor with permanent excitation and powered by an energy source comprises: a power control stage coupleable to the motor for generating a drive signal at a voltage to control the motor at a desired speed; a voltage control circuit connectable between the energy source and the power control stage for controlling the voltage of the drive signal at a first voltage potential in one operating mode and at a voltage potential greater than the first voltage potential in another operating mode; and a mode controller for controlling the operating modes of the voltage control circuit based on properties of the drive signal.

20 Claims, 16 Drawing Sheets

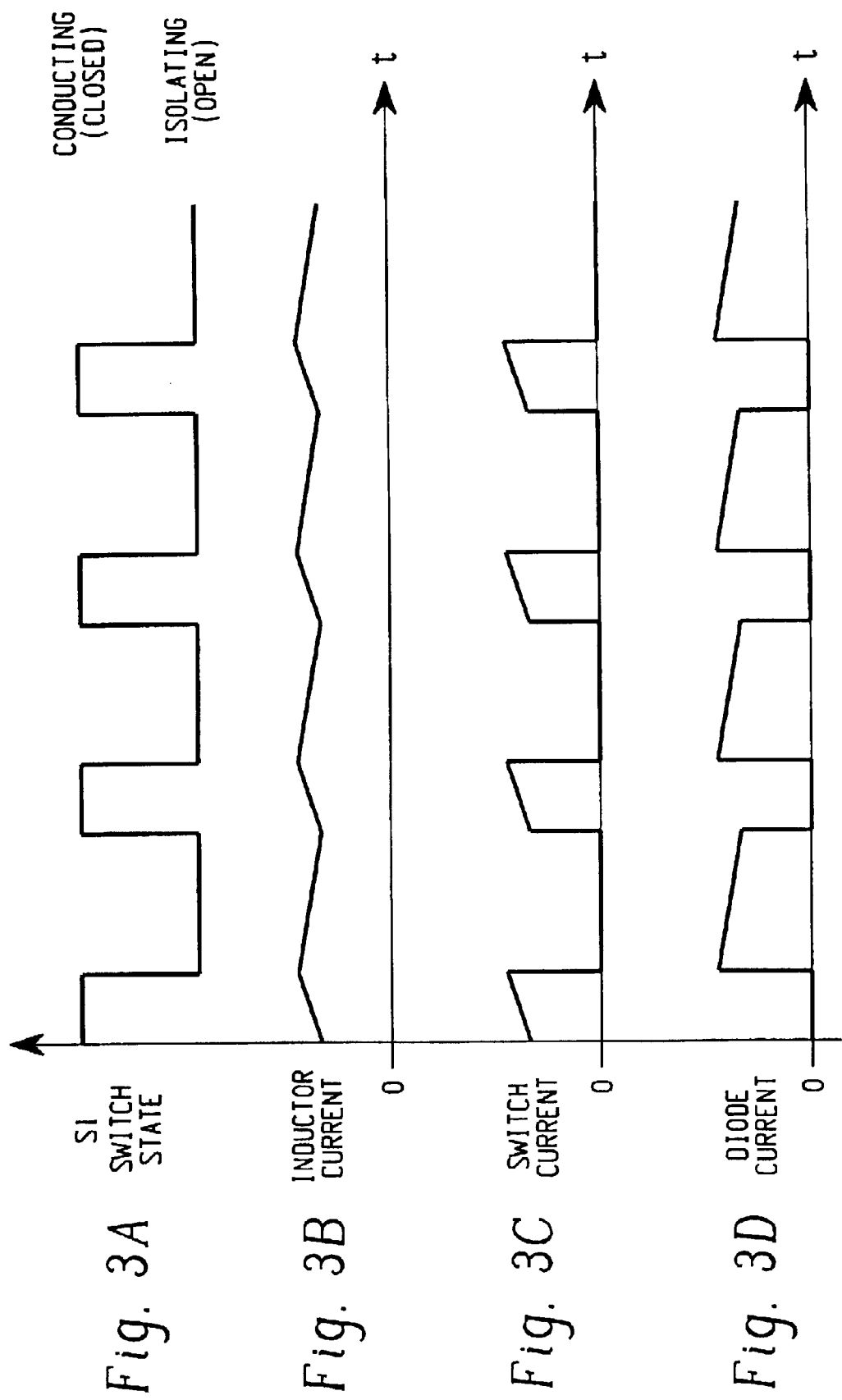

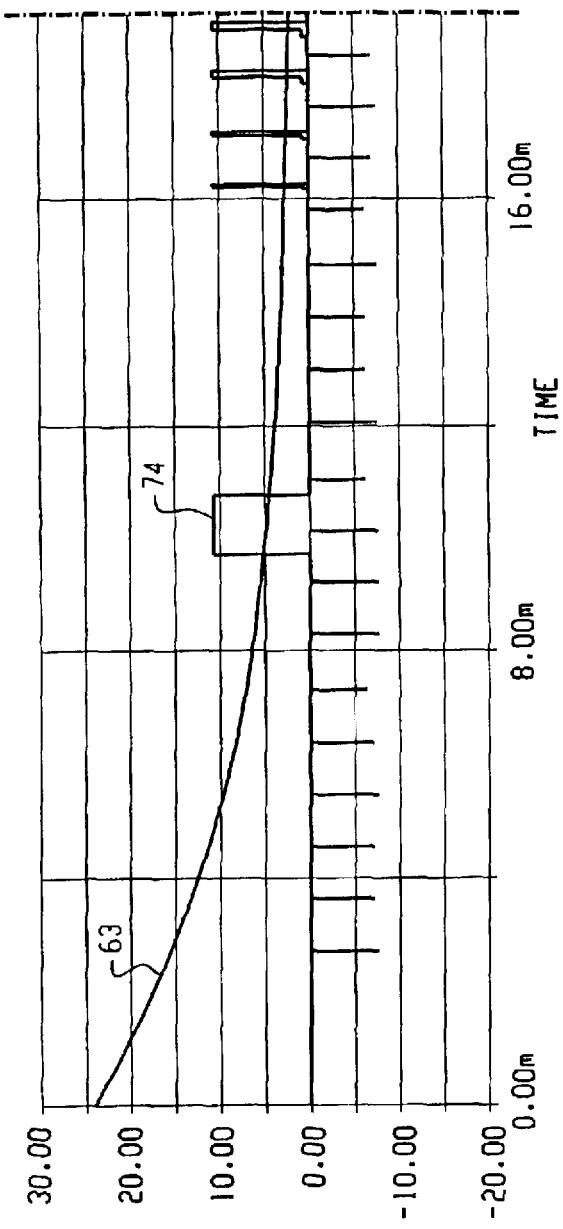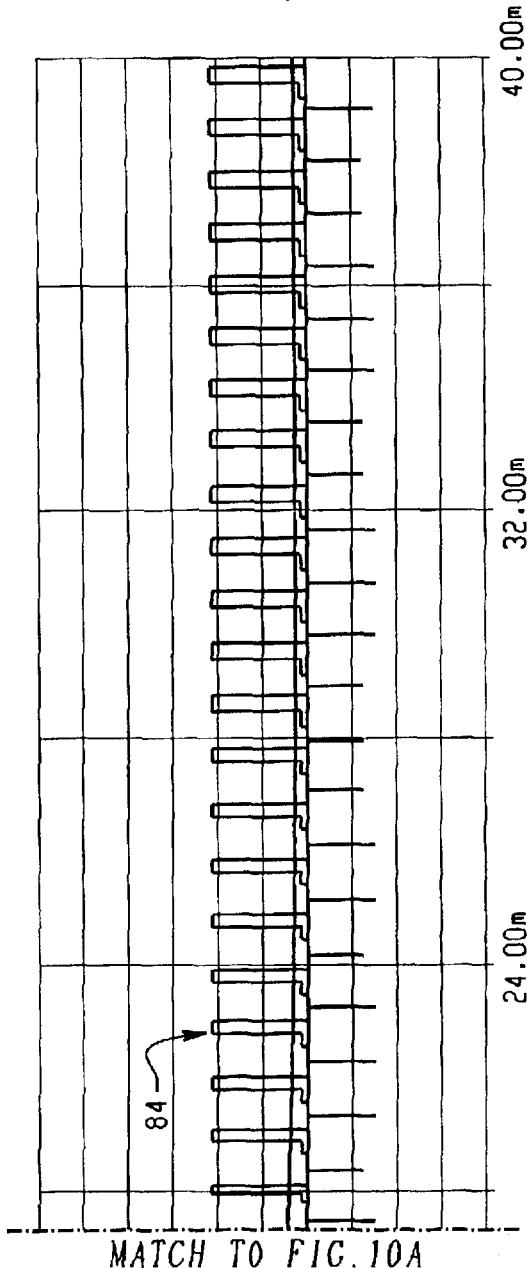

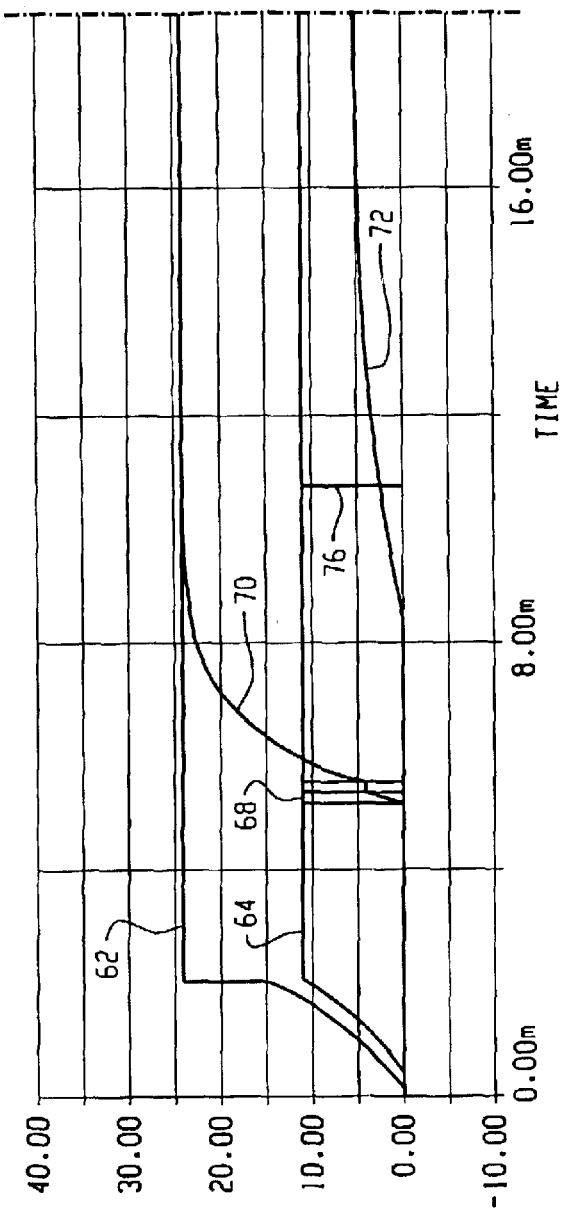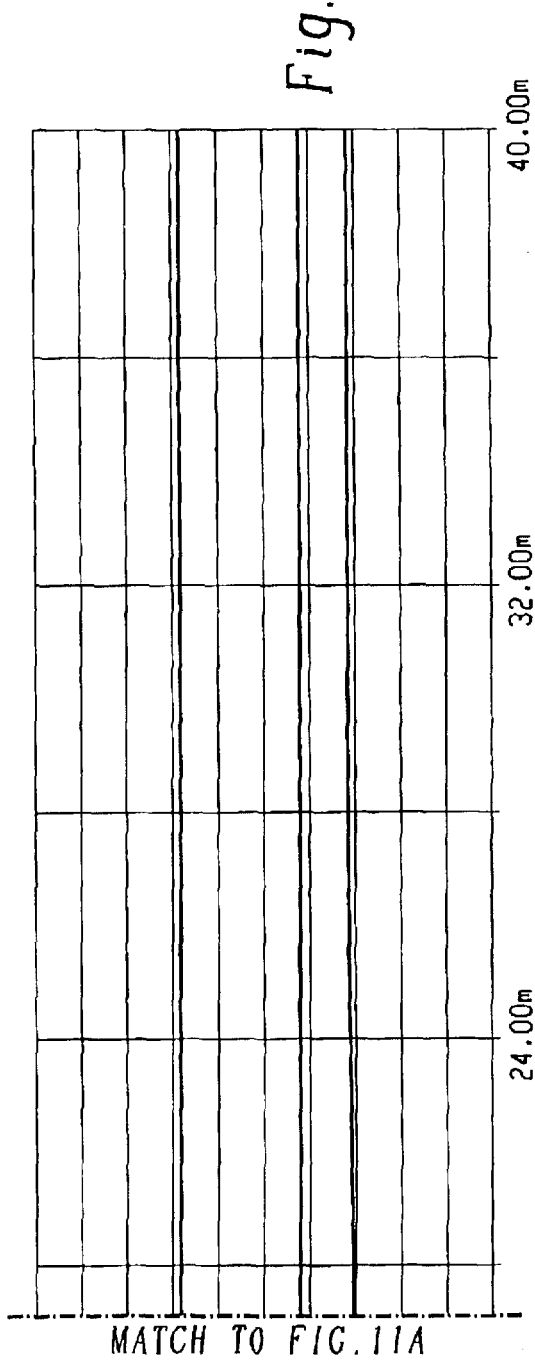

ELECTRIC MOTOR DRIVE CONTROLLER WITH VOLTAGE CONTROL CIRCUIT OPERATIVE IN DIFFERENT MODES

RELATED APPLICATIONS

This Application claims the benefit of the filing date Feb. 6, 2002 of the U.S. provisional application No. 60/354,765, and is a continuation-in-part-application of U.S. patent application Ser. No. 10/068,391, entitled "System and Method for Driving An Electric Vehicle", filed on Feb. 6, 2002, ABN which claims the benefit of the filing date Feb. 6, 2001 of the U.S. provisional application No. 60/266,736, and is assigned to the same assignee as the instant application.

BACKGROUND OF THE INVENTION

The present invention is directed to electric motor drive controllers in general, and more particularly, to an electric motor drive controller comprising a voltage control circuit operative in different operating modes for generating different voltages for a drive signal to control a motor of an electric vehicle powered by an energy source.

A typical electric vehicle draws the energy from an energy storage device such as a battery, sometimes supported by secondary energy sources. The power is processed in a drive power control which controls the voltages and currents which are fed into one to several electric motors. In general, for slow or small scale electric vehicles, such as wheelchairs, bicycles or transportation systems permanent magnet motors are used, i.e. DC, AC or multiphase machines with permanent excitation.

Extending the operating range of motors with permanent excitation generally requires enhancing the voltage and/or current capabilities of a drive power controller. The limited dynamic range of the power controller restricts the system to a certain operating range. As the relationship between current and torque, as well as between voltage and speed is fixed, the controller has to deliver very high currents for high torque output, and very high voltages to achieve high speeds.

A common solution is using motors with a separately adjustable field excitation instead of the permanent excitation. This solution allows additional influence by determining the relationship between voltage and speed (the Ke-Factor), and current and torque. With strong excitation high torque at low currents can be achieved, with weak excitation the motor runs fast at a relatively low voltage in the other winding. Suitable motors consist of an additional armature winding which requires the use of additional slip rings. The drive power controller has to offer additional circuitry to support the additional winding. Another approach is adding a gearbox, or a variable transmission between motor and wheel. For cost reasons these approaches are only applicable to large scale vehicles, or in special circumstances.

An approach related to motors with permanent excitation is a permanent increase of the power supply voltage, for example by increasing the number of battery cells. At given dimensions, this requires reducing the size of the individual cells, increasing the power supply's impedance. At the same time, the motors can take more stall current because of the higher voltage. The system's efficiency would decrease significantly, and special precautions against overload may be required. Further, the effective resolution in terms of Volts/bit rises proportionally, i.e. the voltage steps will become larger. As one consequence, the motors start to run roughly.

The present invention provides a solution which overcomes the drawbacks of the aforementioned solutions to increase the maximum vehicle speed, while fully maintaining the other key parameters.

SUMMARY OF THE INVENTION

In accordance with one aspect of the present invention, an electric motor drive controller for an electric vehicle driven by a motor with permanent excitation and powered by an energy source comprises: a power control stage coupleable to the motor for generating a drive signal at a voltage to control the motor at a desired speed; a voltage control circuit connectable between the energy source and the power control stage for controlling the voltage of the drive signal at a first voltage potential in one operating mode and at a voltage potential greater than the first voltage potential in another operating mode; and a mode controller for controlling the operating modes of the voltage control circuit based on properties of the drive signal.

In accordance with another aspect of the present invention, a motor drive control system for an electric vehicle driven by an electric motor powered by an energy source comprises: a power control stage coupleable to the motor for generating a drive signal at a voltage to control the motor at a desired speed; a first motor drive controller connectable between the energy source and the power control stage for controlling the voltage of the drive signal at a first voltage potential, the first motor drive controller operative to monitor the properties of the drive signal; and a second motor drive controller connectable between the energy source and the power control stage for controlling the voltage of the drive signal at a second voltage potential in one operating mode and at a voltage potential greater than the second voltage potential in another operating mode, the second motor drive controller including a mode controller for communicating with the first motor drive controller to determine the properties of the drive signal and for controlling the operating modes of the second motor drive controller based on the communicated properties of the drive signal.

In accordance with yet another aspect of the present invention, a motor drive control system for an electric vehicle driven by an electric motor powered by an energy source comprises: a power control stage coupleable to the motor for generating a drive signal at a voltage to control the motor at a desired speed; a first motor drive controller connectable between the energy source and the power control stage for controlling the voltage of the drive signal at a first voltage potential; a second motor drive controller connected, when activated, between the energy source and the power control stage for controlling the voltage of the drive signal at a second voltage potential in one operating mode and at a voltage potential greater than the second voltage potential in another operating mode, the second motor drive controller including a mode controller for controlling the operating modes of the second motor drive controller; and the first motor drive controller including means for monitoring the activation status of the second motor drive controller; and means governed by the monitoring means for connecting the first motor drive controller between the energy source and the power control stage based on the monitored activation status of the second motor drive controller.

BRIEF DESCRIPTION OF THE DRAWINGS

FIGS. 3A–3D are time waveforms exemplifying the operation of the booster circuit embodiment of FIG. 2.

FIGS. 9A–9B, 10A/10B and 11A–11B are simulated time waveforms exemplifying the operation of the simulation embodiment of FIGS. 8A–8B.

DETAILED DESCRIPTION OF THE INVENTION

Figure 1:
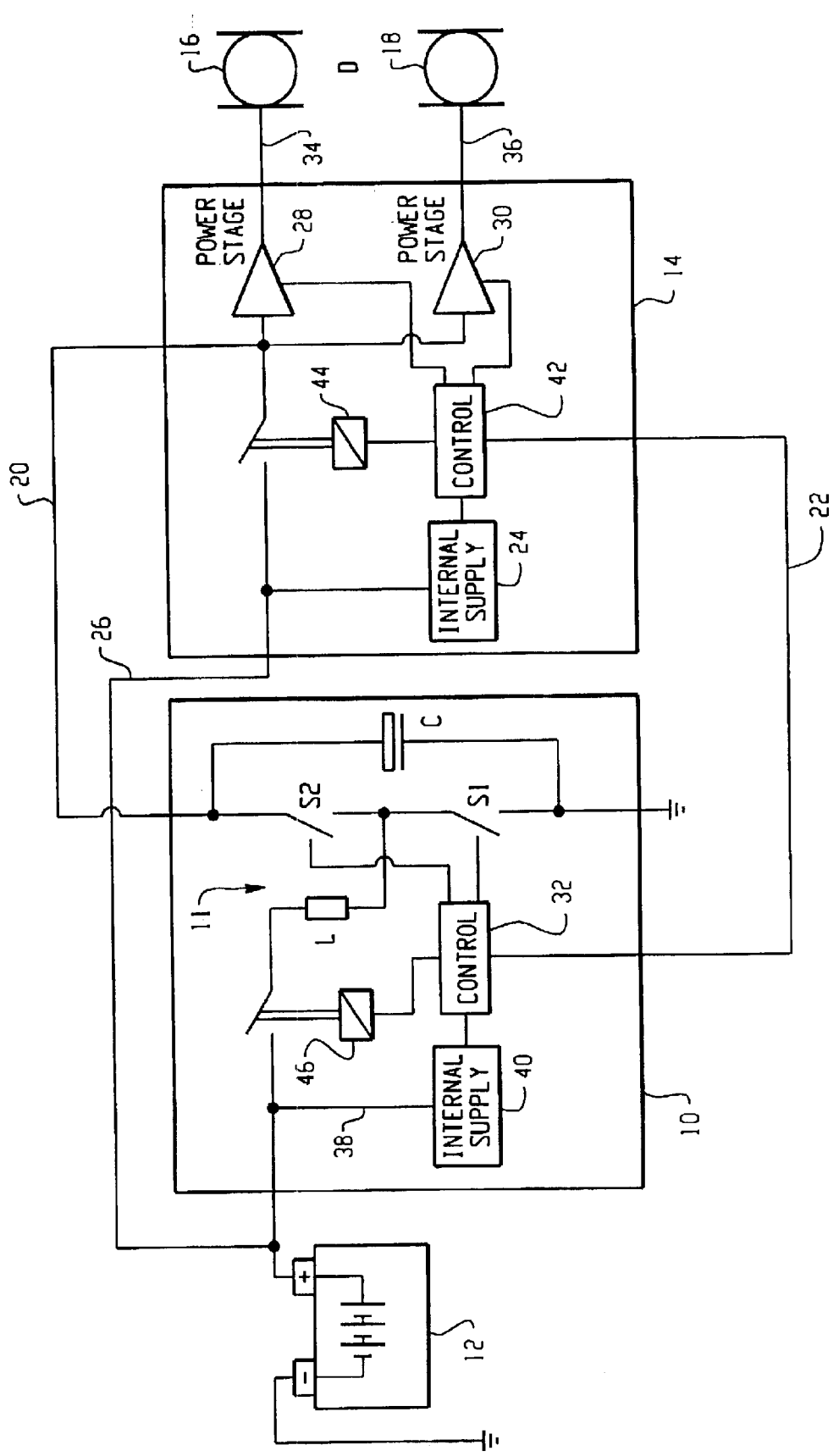
FIG. 1 is a block diagram schematic of a motor control system for an electric motor driven vehicle suitable for embodying the broad principles of the present invention.

As shown in FIG. 1, a motor drive controller 10 including a boost circuit 11 is located between a fixed-voltage energy source 12, like a battery power supply, for example, and a conventional drive power control unit 14 that controls at least one motor 16,18 of a vehicle. In one mode of operation, the boost circuit 11 increases the maximum speed of the vehicle motors 16,18 beyond the limits given by the previously fixed supply voltage 12, by increasing the voltage by a certain amount, which is then supplied to the drive power controller 14 over line 20. The booster circuit 11 may be operated in a variety of modes, including constant voltage increase, variable voltage increase (manual or automatic), or a transparent voltage bypass mode as will be described in greater detail herein below. It also supports negative currents, i.e. recharging the battery power supply 12 using regenerative energy developed by the motors 16,18 is possible. An optional connection over lines 22 to the boost circuit 11 allows the power control unit 14 to automatically adjust the boosted voltage within predetermined limits, according to given load cases.

As noted above, the boost circuit 11 may be operative in a low impedance state (transparent bypass mode), bypassing the power supply voltage in cases where the increased voltage is not needed and where lowest supply resistance is essential, and may be switched to another mode to increase the supply voltage, in steps or linearly, once the maximum motor speed at the power supply voltage is approached. Further, the booster 11 may consist of a multiphase converter to allow phase overlap in order to reduce overall current ripple which otherwise may stress other system components such as capacitors. This multiphase converter will be more fully explained by the description found below.

The foregoing described approach allows extending the operating range of motors with permanent excitation 16,18, characterized by increasing their possible speed while maintaining their torque. Motors 16,18 and their power supply 12 remain unchanged, and in most cases the changes to the power drive control unit 14 are negligible. The method is not restricted to rotational machines.

The boost circuit 11 increases the maximum speed of the vehicle motors 16,18 beyond the limits given by the previously fixed supply voltage 12, by increasing the voltage by a certain amount, which is then supplied to power stage(s) 28,30 of the drive power controller 14 over lines 20. Preferably, the drive power controller's internal supplies shown at 24 continues deriving its energy directly from the vehicle's battery power supply 12 over line 26, i.e. by bypassing the booster circuit 11 of controller 10, this way adaptations to the maximum operating voltage as well as to its enlarged range can be avoided in this section 14. The booster 11 may increase the voltage which is solely applied to the drive control power stage 28,30 of motors 16,18 via line 20.

In the constant voltage increase mode, the booster circuit 11 increases the maximum speed of the vehicle, as if a power supply with a higher voltage output were mounted, similar to increasing the number of battery cells. If a constant voltage increase ratio is chosen, a straightforward circuit which merely generates a fixed duty cycle pulse width modulation (PWM) can be used. As the booster 11 may be active all the time, it contributes to a noticeable efficiency degradation. In addition, because it has to withstand an increased current flow in the worst case, the booster circuit's power capabilities will be adequately high.

An automatic, variable voltage increase mode of the boost circuit 11 may account for this problem, which can be realized either as a linear process or in fixed steps. This can be achieved by adding a simple unidirectional or bidirectional communication path 22 between drive control 14 and a control circuit 32 of the booster circuit 11. Here, the drive control 14 can easily determine the presence or activation of the booster 11. As an example, the control 14 can output a test signal to a control circuit 32 in controller 10 over communication path 22 prior to any activation or during system startup. The controller 14 then detects whether it receives an elevated voltage, which indicates an attached booster 11. If not found, the drive controller 14 will continue operating as usual. If a booster 11 is found to be operative, the power controller 14 commences operation, but now using the voltage generated by the booster 11 over lines 20 as the main supply for its power stage 28,30. During operation, the controller 14 continuously checks for potential limits and outputs the need for the required voltage increase to the control circuit 32 of the booster 11.

As an alternative solution, the control circuit 32 within motor controller 10 may detect the need for and the level of the voltage increase on its own, by observing the PWM duty cycles of the drive signal 34,36 delivered by the drive control power stage 28,30 over communication path 22, and, if desired, also the motor currents of the drive signal 34,36. This way the drive power control 14 need not support any additional communication. The only structural changes needed are that the dual supplies are made available externally, i.e. bypassed battery voltage over lines 26 and 38 for internal supplies 24 and 40 and boosted voltage over line 20 for the power stage 28,30, and that the control units 32 and 42 account for the higher possible speed.

Access to the separate supplies is given in most cases, as the power input (line 26) and the power stage 28,30 of the drive controller 14 are separated by means of an isolation relay 44, protecting against malfunction and reverse polarity, following federal regulations. For continued safety, another similar isolation relay 46 can be used in the motor controller circuit 10. Then, the drive control 14 may disable its own isolation relay 44 by control unit 42 when it detects an attached or operative booster circuit 11, to avoid simply short circuiting the output voltages of the booster 11 and controller 14.

In practice, performance may be also achieved if the drive control unit 14 also controls the output voltage of the motor controller 10 in the various modes. Generally, the control (32) of the booster circuit 11 within controller 10 may work as follows: at high drive signal currents, the voltage increase of the booster circuit 11 should be low (transparent voltage bypass mode), to avoid extreme stress by a further increased current flow in stall conditions which otherwise would be subjected to the system due to the higher operating voltage. At sufficiently low drive signal currents, the voltage generated by controller 10 can increase to the desired level. The drive power control 14 does so when detecting that the voltage of its drive signal 34,36 to the motors 16,18 approaches the maximum value at the present power stage voltage, e.g. approaches within a predetermined range of 100% duty cycle. It then commands the booster 11 via control circuit 32 over lines 22 to supply more voltage (constant or variable voltage increase mode), if possible, i.e. if current and other limits are not exceeded.

Alternatively, controller 14 may supply a signal representative of the drive signal over lines 22 to control circuit 32 when the drive current and other limits are not exceeded so that control 32 may monitor the drive signal and determine itself when a voltage increase is needed, i.e. a mode change.

Figure 2:
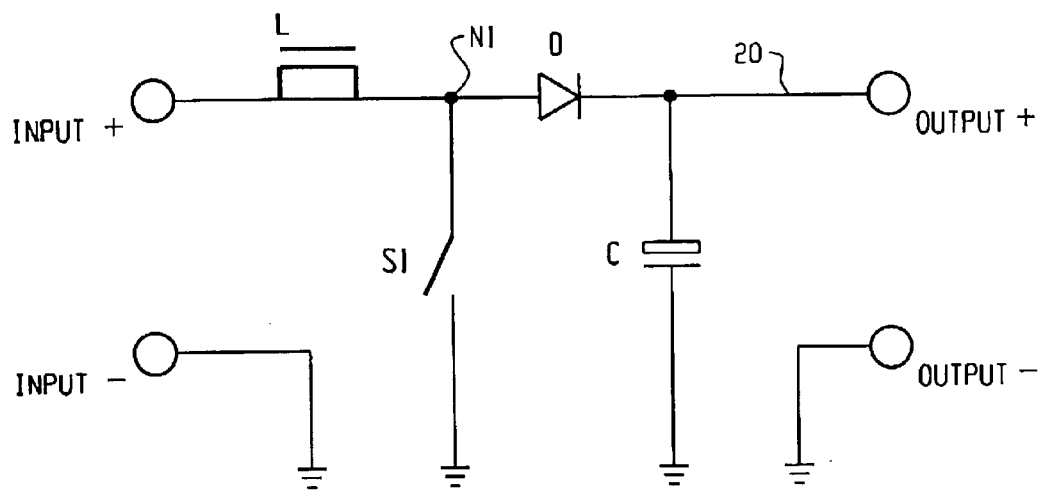
FIG. 2 is a circuit schematic of a booster circuit embodiment suitable for use in the embodiment of FIG. 1.

A block diagram of a typical boost, or step-up circuit 11 suitable for use in the motor controller embodiment 10 is shown in FIG. 2. Basically, a first energy storage element which may comprise an inductance L is connectable in series with the positive terminal of the battery source (INPUT+). For this embodiment, a single switch S1 is coupled between the first energy storage element L and the negative terminal (INPUT−) of the battery source and in one mode of operation, is cycled between open and closed states at a frequency between some kHz and several MHz, depending on size and architecture of the storage element L. The cycling of switch S1 may be performed at a pulse width modulation (PWM) ratio, i.e. the duty cycle of the switch, which determines the relationship between input and output voltage of the storage element L. A second energy storage element which may comprise a capacitor C is connectable in parallel with the terminals INPUT+ and INPUT− of the battery source. A diode D is connected anode to cathode from storage element L to the storage element C. The voltage developed across the capacitor C controls the voltage of the drive signal via line 20 as shown in the block diagram schematic of FIG. 1.

Referring to FIG. 2, as S1 closes or conducts, energy and current builds up in the inductor L. After a specified duty cycle time, S1 opens or isolates and the built up energy in inductance L is transferred to the capacitor C or the output via the diode D. Since the energy is transferred discontinuously, capacitor C smoothes the voltage appearing at the output, i.e. over line 20. The waveforms of FIGS. 3A–3D illustrate the switch states of S1 and corresponding currents in the circuit of FIG. 2.

The voltage ratio between the voltage across capacitor C or output voltage and the voltage of the battery source is determined by the duty cycle of switch S1. For example, a switch S1 duty cycle ratio of approximately 33% can cause a voltage increase of approximately 50% over the voltage of the battery source. In transitioning between modes, switch S1 may be pulsed with a variable duty cycle from 0% to a predetermined duty cycle, for example, over a predetermined period of time to cause the output voltage to increase gradually to the desired level. The desired voltage across capacitor C or output voltage is maintained above the voltage of the battery source by the diode D, i.e. substantially no diode current flows when switch S1 closes (see FIGS. 3A and 3D), notwithstanding the voltage at node N1 being duty cycled to zero potential.

Figure 4:
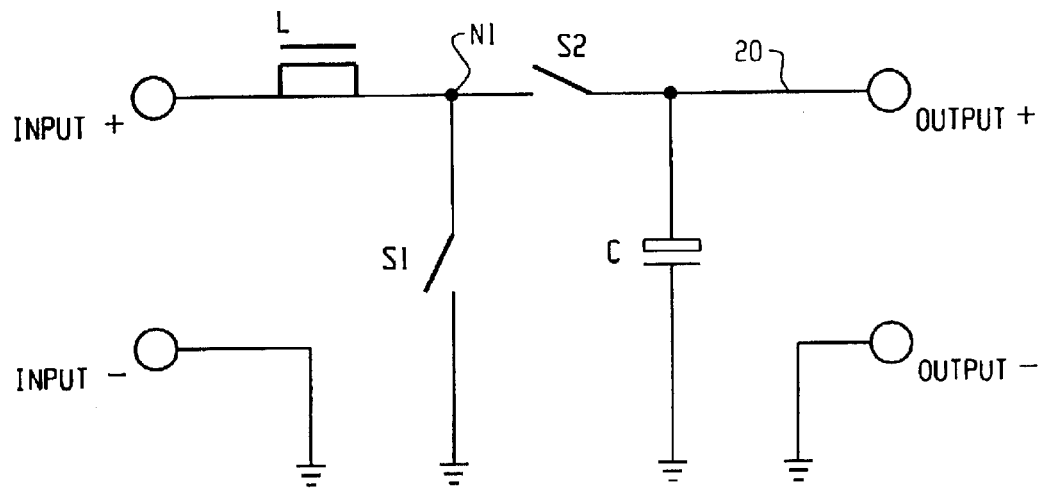
FIG. 4 is a circuit schematic of an alternate booster circuit embodiment suitable for use in the embodiment of FIG. 1.

In an alternate booster circuit embodiment as shown in the circuit schematic of FIG. 4, the diode D is replaced by a second switch S2, forming a synchronous half bridge construction wherein switches S1 and S2 are pulsed complementarily between their open and closed states. That is, when switch S1 is closed, switch S2 is opened, and vice versa. Because the diode's forward voltage drop decreases circuit operating efficiency significantly, especially at low voltages, replacing the diode with a switch S2 of low impedance reduces the voltage drop substantially, thus increasing efficiency. At the same time, the synchronous construction allows for a reverse energy transfer through switch S2 when closed, which is definitely needed in electric vehicles. Because of the cycling, the energy transfer from this circuit embodiment to the output is done in "chunks", which results in a current ripple on the output: the current flow cycles between zero and a value higher than the load current. A suitable capacitor C attached to the output (line 20) is scaled to even out this ripple, converting it to a residual voltage ripple.

Figure 6:
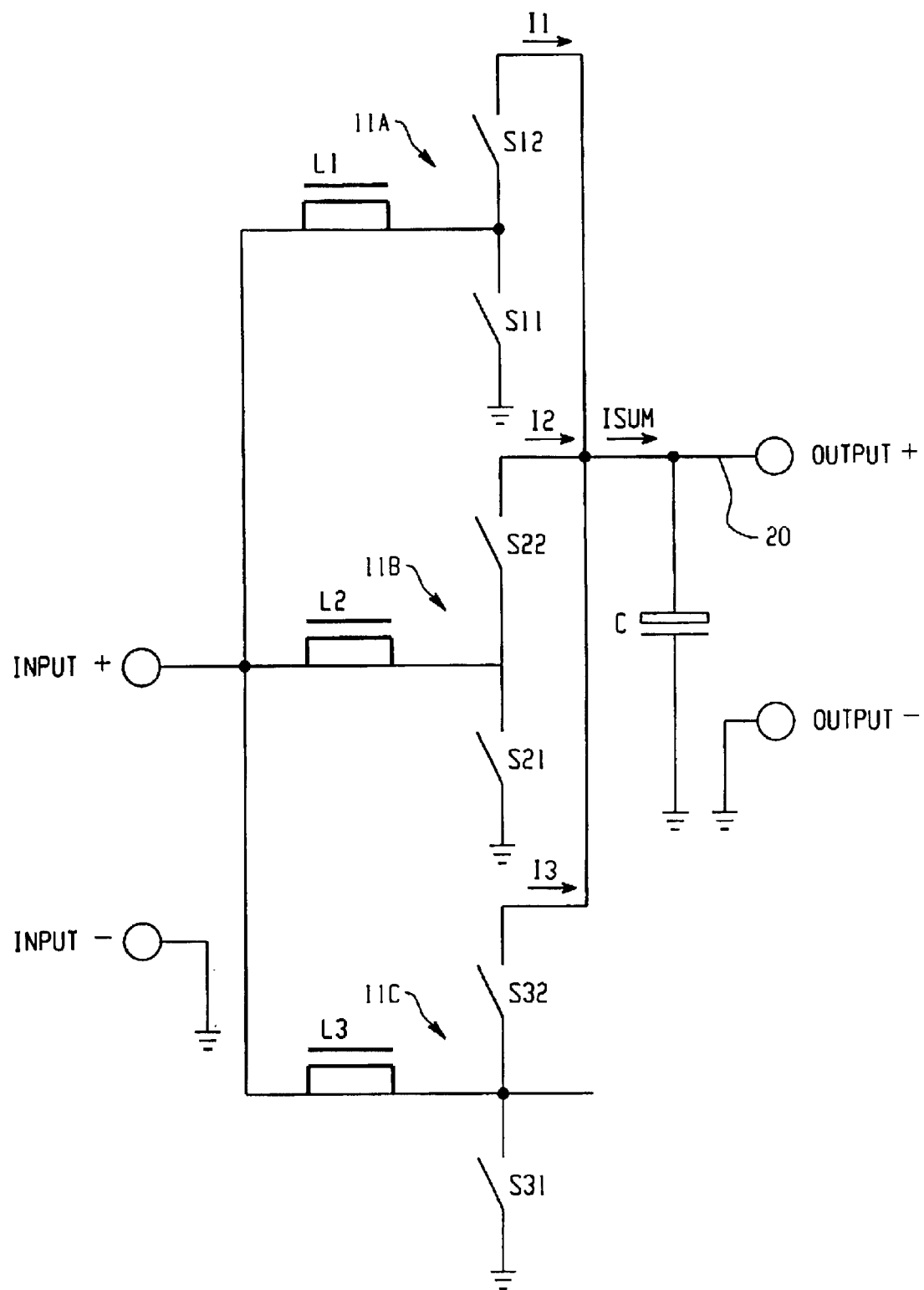
FIG. 6 is a circuit schematic of a booster circuit including a multiphase converter suitable for use in the embodiment of FIG. 1.

Multiple phase converters, i.e. multiple circuits containing elements L, S1 and S2, for example, may spread the conversion task over several smaller, interleaving channels which will be explained in greater detail herein below in connection with the circuit embodiment illustrated in FIG. 6. This way, the current ripple can be reduced as well as the residual voltage ripple. For example, as a 50% increase in voltage requires a switch S1 duty cycle of 33.3%, three interleaving converters can reduce the ripple to the lowest possible value, the energy transfer is substantially seamless. The remaining ripple is caused by the inductors, no longer by the load current.

In contrast to voltage regulators, where a control loop stabilizes the output voltage by adjusting the PWM duty cycle depending on output voltage deviations from a reference level, such a control is not desired in the suggested booster circuit embodiments. The duty cycle should remain either fixed, or preferably, varied or steered under direct control by the drive power controller 14 via communication path 22 and control circuit 32. Note that in order to support the transparent bypass mode, the circuit embodiment of FIG. 4 should be able to turn on (close) the upper switch S2 all the time and keep switch S1 open.

Typical bridge configurations such as in the embodiment of FIG. 4 are restricted in these terms: the on-time of the upper switch S2 is limited. This stems from the fact that the switches S1 and S2 are generally built using semiconductors, such as metal oxide semiconductor field effect transistors (MOSFETs) or insulated gate bipolar transistors (IGBTs), for example. In general, the circuits within control 32 driving these components do not support a "floating supply", i.e. the voltage of node N1 for switch S2. The latter designates a supply which is referenced to the potential of switch S2.

Figure 5:
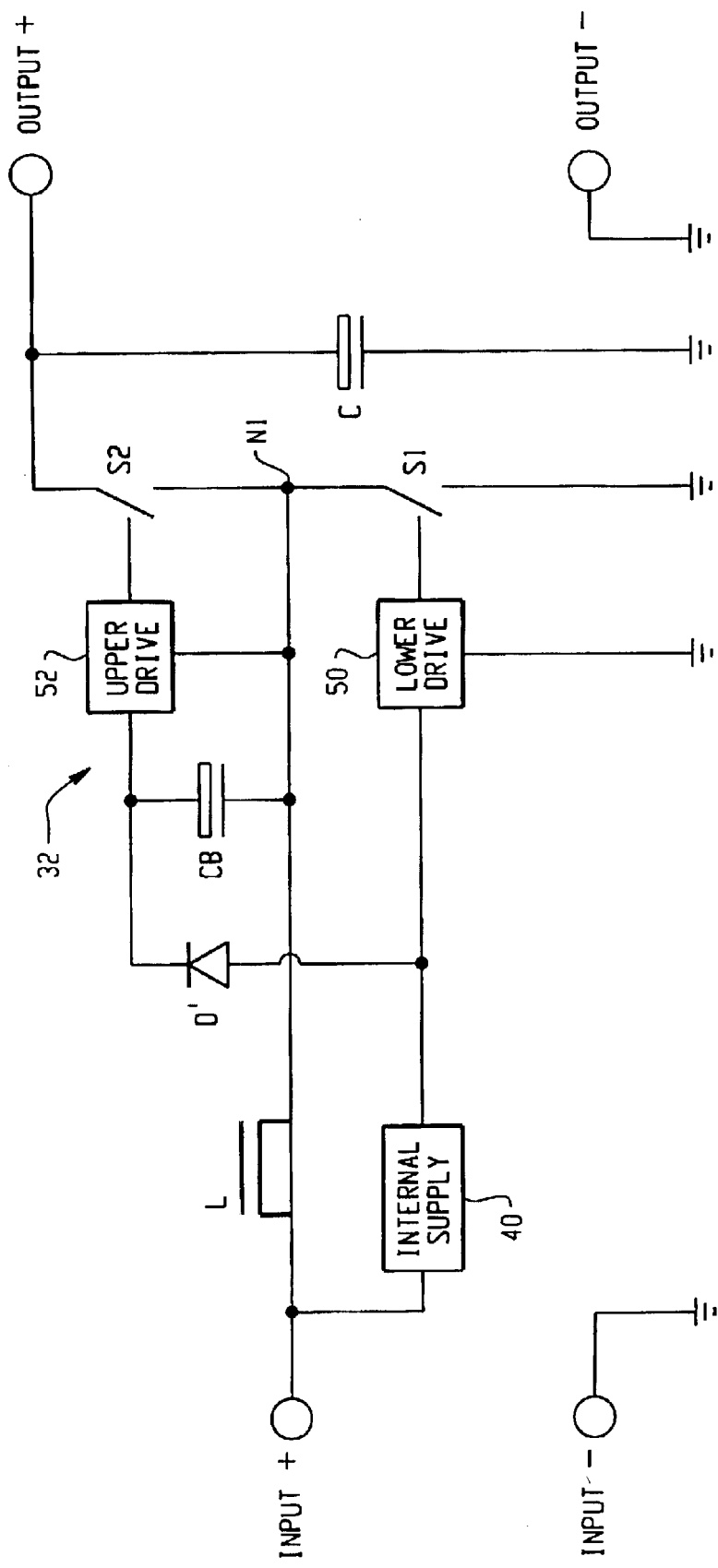
FIG. 5 is a block diagram schematic of a booster circuit employing a bootstrap supply for the switch drive circuits suitable for use in the embodiment of FIG. 1.

To achieve the driving of a switch with a "floating supply", most circuits use a "bootstrap" supply as shown by the circuit embodiment of FIG. 5. Referring to FIG. 5, switches S1 and S2 are driven by drive circuits 50 and 52, respectively, which may be part of control 32 as shown in FIG. 1. Since switch S1 is referenced to a fixed voltage potential (INPUT−), the drive 50 may be operated from the voltage potential of the internal supply 40 without adjustment. However, switch S2 is referenced to the voltage of node N1 which is floating. Thus, the drive 52 is referenced to the "bootstrap" voltage generated from a circuit consisting of a diode D' and a capacitor CB referenced to the voltage of the node N1. Permanent cycling of the booster stage refreshes the charge in the bootstrap supply capacitor CB via diode D'. The voltage developed across CB may then be used as the floating supply for drive 52. However, adding 100% duty cycle capability of switch S2 to support the transparent bypass mode requires maintaining the voltage across CB in some manner notwithstanding that no cycling of drive 52 takes place. Some suitable circuit arrangements (not shown) for this purpose include using a charge pump, a transformer or similar circuit arrangements.

Finally, as referred to herein above, a multiphase or polyphase converter may be used in the embodiment of FIG. 1 for smoothing out the voltage at the output, i.e. across capacitor C. A suitable circuit arrangement for such a converter using three voltage booster circuits 11A, 11B, and 11C by way of example is shown in FIG. 6. Each booster circuit 11A, 11B and 11C includes an inductor L and set of complementarily operated switches. For example, booster circuit 11A includes inductor L1 and switches S11 and S12 patterned after the circuit embodiment described in connection with FIG. 4. Likewise, booster circuits 11B and 11C include: inductor L2 and switches S21 and S22, and inductor L3 and switches S31 and S32, respectively, each in the same circuit arrangement as booster circuit 11A. All of the booster circuits 11A, 11B and 11C feed the sum I(sum) of their respective interleaved currents I1, I2 and I3 into the common capacitor C.

Figure 7A:
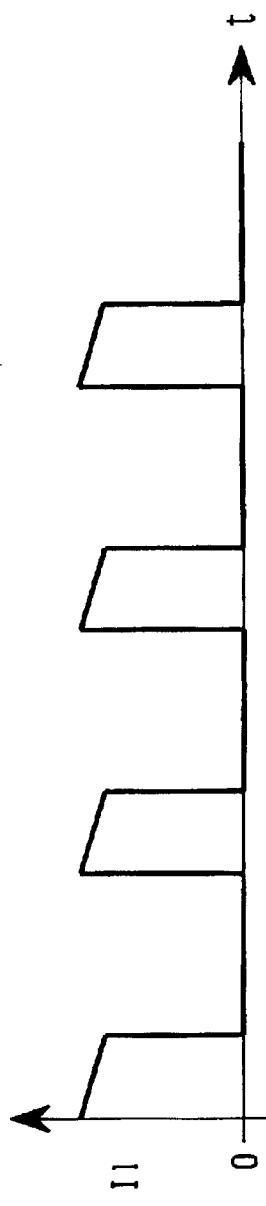
FIGS. 7A–7D are time current waveforms exemplifying the operation of the multiphase converter of FIG. 6.
Figure 7B:
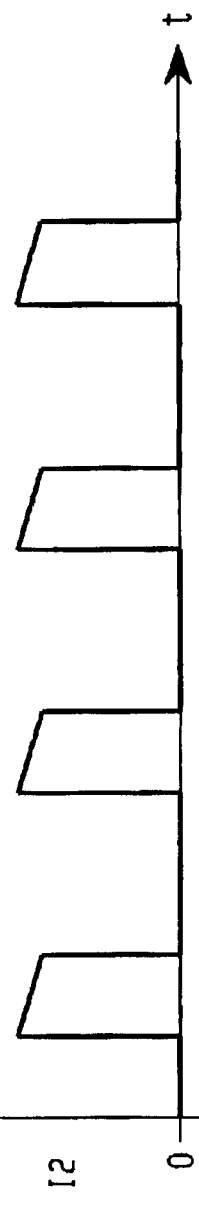
Figure 7C:
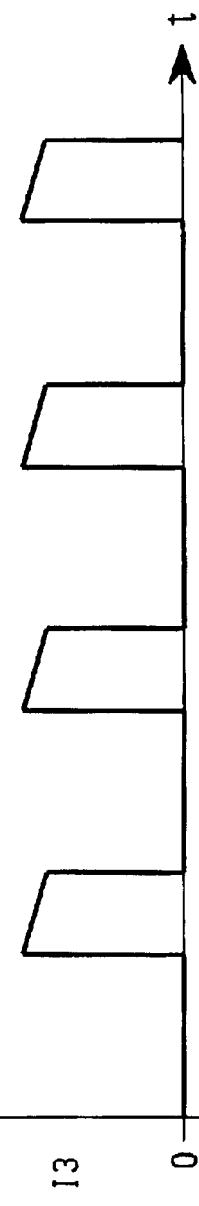
Figure 7D:
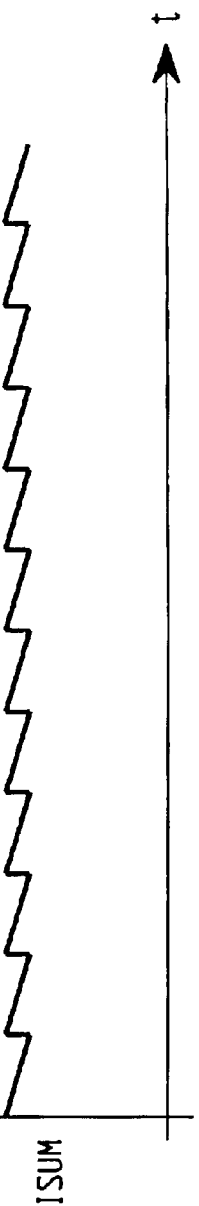

As the switching times of the switches of the booster circuits 11A, 11B and 11C and their corresponding currents I1, I2 and I3 are interleaved as shown by way of example in the time waveforms of FIGS. 7A–7C, the resulting overall current I(sum) can be smoothed as shown in time waveform of FIG. 7D. The time waveforms of FIGS. 7A–7D illustrate a three-phase converter at an ideal interleave, which is, at an approximate 50% voltage increase, a duty cycle of 33.3%. Also, the load is spread over three similar booster stages 11A, 11B and 11C, each of which being smaller in size. In practice, this is an advantage from both a circuit designer's and a manufacturer's point of view; the overall design benefits from higher frequencies, higher efficiency, reduced parasitic effects and reduced component size.

As noted above, the preferred embodiment of the invention is shown in FIG. 1. More specifically, shown in FIG. 1 is an energy source or battery 12 coupled to the motor controller 10 which includes the internal supply 40, mode control 32 and the booster circuit 11, and the drive power control 14 which includes the internal supply 24, control 42 and power stage 28,30. The power stage 28,30 generates the drive signal(s) 34,36 to control the electric motor(s) 16,18. The drive power control 14 draws its supplemental power directly from the battery via internal supply 24 using the bypass line 26, and its power stage(s) 28, 30 derives the voltage and energy from the booster circuit 11 via conductor 20. The whole arrangement may be mounted in a variety of electric vehicles. The controller 14 can send information about activation and required voltage increase to the booster 11 from control 42 to control 32 using communication path 22. This information can be sent over communication path 22 in the form of any suitable electrical signal including a Pulse-Width Modulated (PWM) drive signal, an varying analog signal, a serial/digital bit stream signal, or any conventional bus form of data signal.

In one mode of operation, the booster circuit 11 is absent or inoperative and the internal isolation relay 44 of motor controller 14 is activated, which connects the power stage(s) 28,30 directly to the battery supply 12 via bypass line 26. Once the controller 14 detects via communication path 22 that the booster 11 is operative or attached, it disables activation of its internal isolation relay 44. The relay 46 in the controller 10 replaces its function and also satisfies or accounts for safety regulations. The booster's output voltage (voltage across capacitor C) is then fed via line 20 into the power stage(s) 28, 30.

If the drive controller 14 recognizes that no booster support for increase of vehicle speed is needed, it can force the booster 11 into the previously described transparent bypass mode, disabling any cycling of switches S1 and S2 and establishing a low resistance path through the booster via switch S2. Alternatively, the efforts related to the requirement of a 100% duty cycle support needed for bypassing can be saved if the drive controller 14 reactivates the internal isolation relay 44 instead once it disables the booster 11. In these situations all power to the booster 11 can be cut via relay 46.

Alternatively, communication path 22 may be used for the approach where the booster circuit 11 via control 32 derives information about the drive signal 28,30 of controller 14, allowing the control circuit 32 of motor controller 10 to determine the needed amount of voltage booster increase by itself. In this mode of operation, the isolation relay 44 of controller 14 may be disabled manually, since the controller 14 may not detect the absence or presence of a booster 11. For the same reason, the above-described use of the internal isolation relay 44 as an alternative to the transparent mode bypassing is not available.

As noted above, the booster circuit 11 may remain active all the time, reducing the operational efficiency thereof unnecessarily. Hence, in the alternative, the booster circuit 11 could stay completely passive during the time where it identifies that elevated voltages are not needed, or when high currents appear (i.e. transparent voltage bypass mode)—doing so, the energy consumption of a permanent cycling, which is typical for switching converters, can be completely avoided during most of the operating time.

Accordingly, the voltage booster circuit 11 may be operated by mode control 32 to switch in a further energy saving bypass mode, or low-impedance mode. In this mode, the booster 11 has to support 100% "on" time for one of its switches S2 which may be accomplished as explained herein above. Thus, in this configuration, the switch component's switching losses are eliminated, and the inductor's (L) magnetic core can be shrunk to a small size, compared to a permanently cycling solution. As no cycling takes place when the booster 11 is subjected to very high currents, no inductance is needed which otherwise would be needed to keep the booster 11 operative and cycling. In other words, the core of inductor L is allowed to saturate during these operating conditions. Then, the only possible source for losses in this mode is DC resistance (static conduction loss), which primarily consists of switch S2 resistance, inductor winding and internal booster wiring. In contrast to a live, cycling booster, the series impedance of the bypassed circuit is substantially lower. In addition, all energy consumption due to a permanent cycling of the internal switches will be saved. In the alternative, if the drive power controller 14 does not need booster support, it forces the booster 11 into a stand by mode and activates the internal isolation relay 44 instead, thus bypassing the current path 20 through the booster 11.

The present embodiment generally applies to cost effective electric motors with permanent excitation (i.e. when using permanent magnets), which have a fixed relationship between voltage and speed, as well as between current and torque. These motors are widely used in slow vehicles, such as wheelchairs, electric bicycles or transportation systems. In these applications, the required current capability of the power control unit is determined by the load resistance, i.e. primarily by the motor winding resistance. Subjected to a stall condition, the motor will take the maximum current, and deliver the maximum torque, which is common practice on this type of machines. As the voltages and currents do not change in the described typical embodiment of the invention, the respective performance characteristics of the overall propulsion unit can be maintained. The impedance matching between power source 12, motor controller 10, power stage(s) 28,30 and motors 16,18 can be kept at an optimum. The smooth run of the motors is also maintained, because the resolution of a typical power stage of conventional controller 14, expressed as Volts/bit, remains unchanged, in contrast to a solution where the operating voltage is permanently increased. The only effective change is that the maximum speed of the motor 16,18, thus vehicle, can be increased when needed. During this time the current consumption is relatively low, allowing a higher impedance of the power supply, which matches the given behavior of the activated booster converter circuit 11. The booster circuit 11 even increases the amount of power the system can process, as the higher motor speed is directly linked to higher power levels at a given system structure.

Hence, the embodiment of FIG. 1 provides a motor controller 10 having the following attributes:

regenerative or negative current flow to return energy back to the battery;

constant voltage increase mode providing for a fixed duty cycle PWM; or, in the alternative, an automatic variable voltage increase circuit via a communication path 22 between the booster circuit 11 via control 32 and the controller 14 (if booster is present, booster is used as the main power supply via line 20 to driver power stage and the controller 14 continuously checks for limits and outputs the required voltage increase signal via path 22 to the booster 11); or in the alternative, a booster control mode wherein the booster circuit 11 via control 32 detects the need for and the level of voltage increase by observing the PWM duty cycles being deliver to the driver power stage 28,30; and, as an option, passive booster mode during periods of no boost for conserving energy by reducing or eliminating the booster circuit's cycling periods.

Figure 8A:
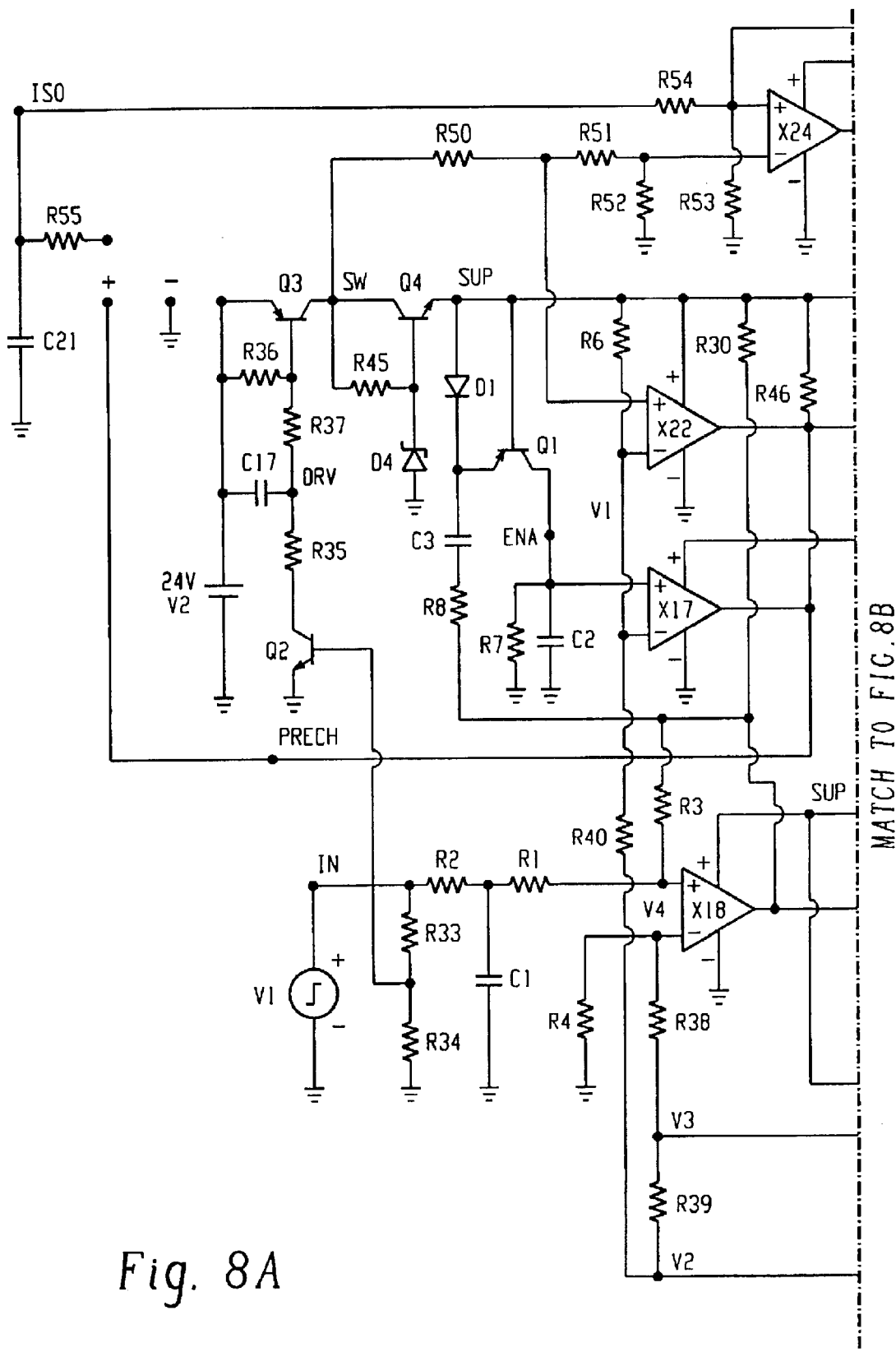
FIGS. 8A–8B is a circuit schematic of a mode control circuit suitable for simulation of the embodiment of FIG. 1.
Figure 8B:
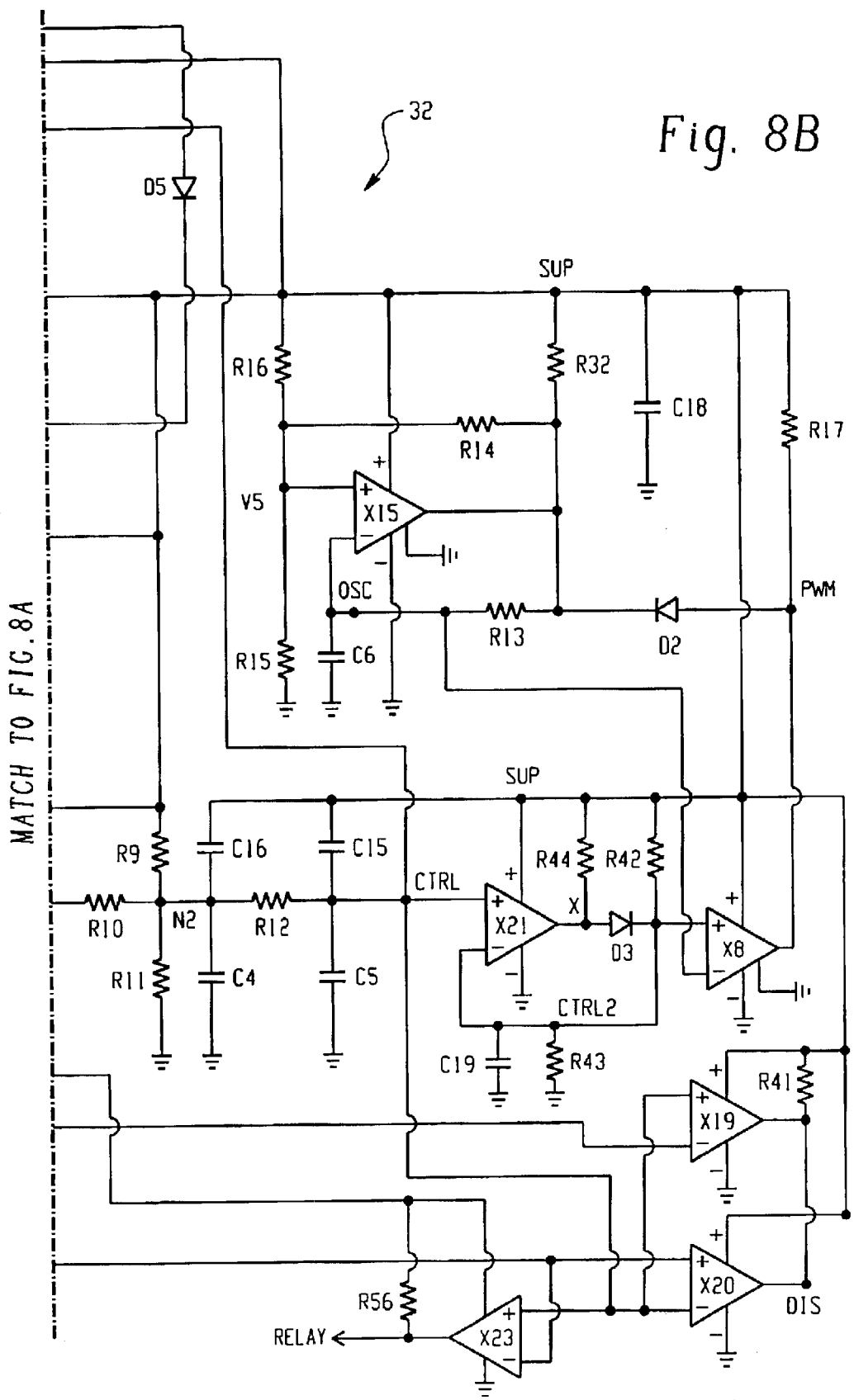
Figure 9A:
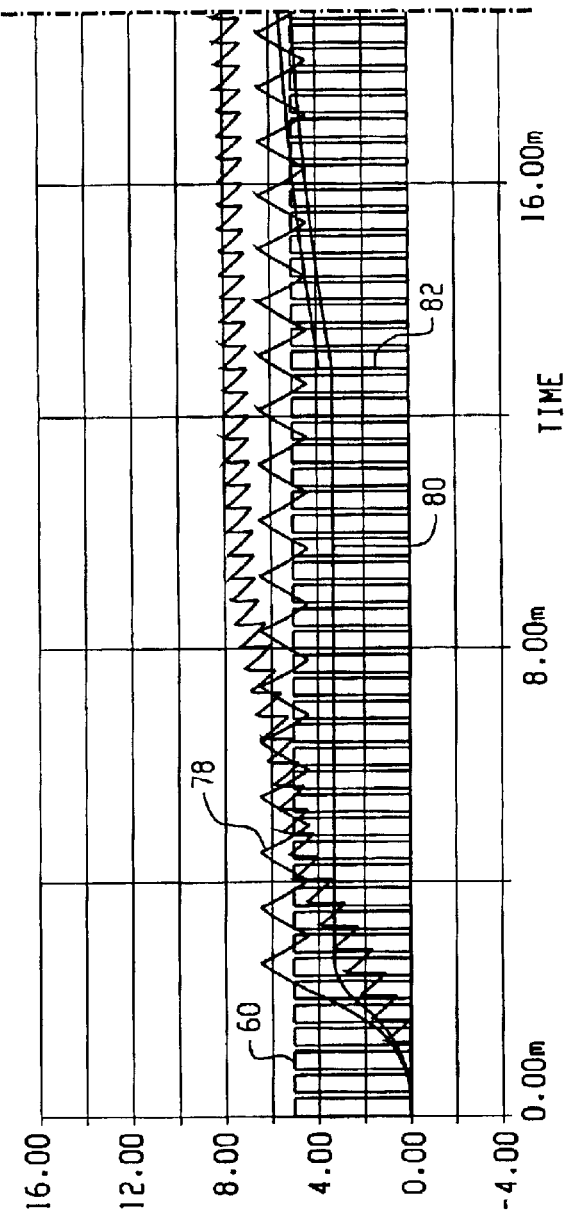
Figure 9B:
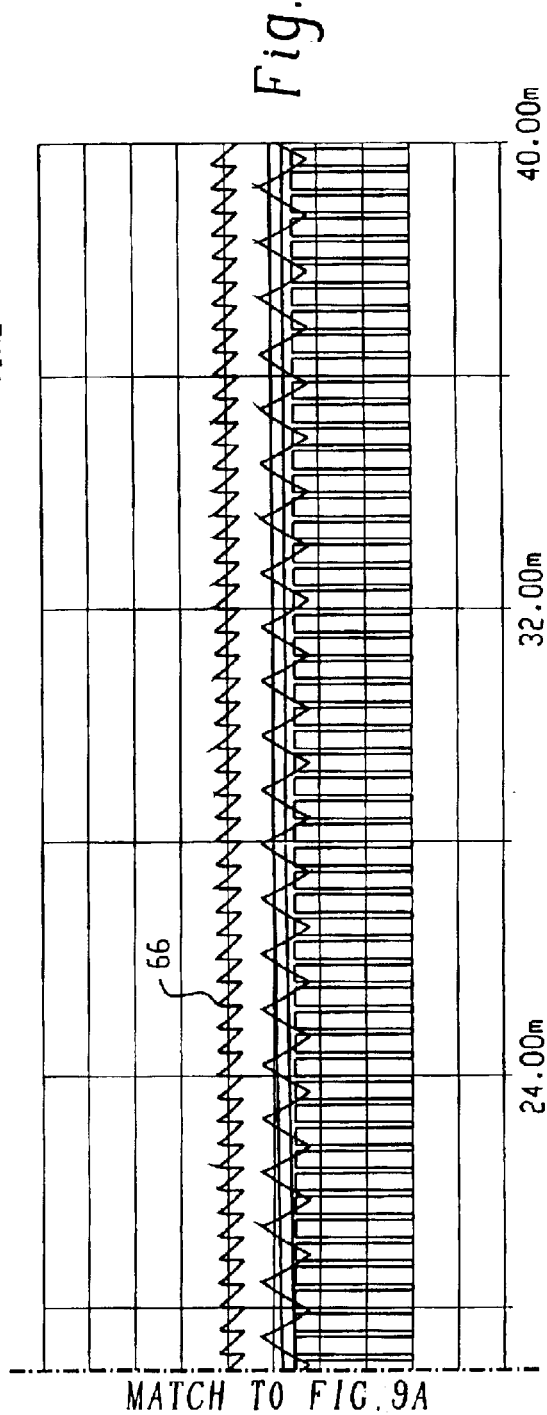

A suitable embodiment of the mode control 32 for use in motor controller 10 is shown, by way of example, in the circuit schematic of FIG. 8 which may be used for simulation purposes. Simulated time waveforms of critical nodes of the mode control circuit embodiment after startup are shown in FIGS. 9, 10 and 11. Such simulation waveforms closely parallel real physical measurements and are very useful to visualizing the circuit's operation. A fixed PWM on the input node IN is representative of a signal generated by control unit 42, routed over communication link 22, indicating that an increased voltage should be supplied to the power stages 28,30, i.e. the drive signal 34,36 is within the predetermined range of maximum. Further, the operating frequencies (capacitors) of the simulation embodiment are scaled in a way that the waveforms can be easily observed. In the present embodiment, the PWM of the drive signal 34,36 runs at a frequency of approximately 100 kHz, but is scaled as illustrated by the PWM waveform 60 in FIG. 9.

Referring now specifically to FIG. 8, the circuitry around transistors Q3 and Q2 switches in the battery supply V2 which may be on the order of 24 volts, for example, to an internal supply SW at approximately the same voltage level, once some voltage on the input IN is detected which occurs at time O in the waveforms of FIGS. 9, 10 and 11. The simulation waveform 62 in FIG. 11 shows the rise of the voltage SW from 0–2 milliseconds (ms). More specifically, the PWM signal IN drives the base of the NPN transistor Q2 via resistor divider network R33 and R34 to switch Q2 "on", i.e. conducting. When "on", Q2 drives the base of PNP transistor Q3 via a divider/filter network comprising resistors R35, R36, R37 and capacitor C17 to switch Q3 permanently "on" which conducts the voltage of V2 to the circuit node SW. Note that when Q3 is switched on, the voltage at the node DRV which is the connecting node of components C17, R35 and R37 falls from the battery voltage potential to near zero as shown by the waveform 63 in FIG. 10.

In the shown simulation, the circuit combination of NPN transistor Q4 and zener diode D4 coupled between nodes SW and SUP simulates a voltage regulator. A resistor R45 coupled between node SW and the zener D4 maintains a voltage across zener D4 which is used as a reference voltage to regulate the voltage at SUP to approximately 12 volts (refer to waveform 64 in FIG. 11). The voltage at node or bus SUP is the internal supply for the mode controller simulation circuitry. There may be one or more decoupling capacitors connected between the SUP and battery common as exemplified by capacitor C18. A resistance divider circuit connected between the internal supply and battery common and comprising series resisters R6, R40, R39, R38 and R4 produces various reference voltages. For example, reference voltages V1, V2, V3, and V4 are produced at the nodes of the series resistors.

The input signal IN is filtered through a single pole filter circuit comprising resistor R2 and capacitor C1 and compared with the reference voltage V4 is a comparator circuit X18. More specifically, a noise-filtered IN signal is coupled to the +input of X18 through resistance R1 and reference voltage V4 is coupled to the –input of X18. Some positive feedback for comparator circuit X18 is provided by resistor R3. Accordingly, comparator X18 operates as a Schmitt trigger, to ensure clean switching transitions at its output (via pull up resistor R30) when IN signal rises above and falls below reference V4. Thus, the output of X18 is representative of the PWM drive signal in frequency and duty cycle.

This signal (output of X18) is coupled to the emitter of an PNP transistor Q1 via the series combination of resistor R8 and capacitor C3 which is clamped to the SUP bus by a diode D1. The base of Q1 is also referenced to the SUP bus. The circuit transfers the charge stored in C3 to C2/R7 on every cycle. In this manner, the frequency of the PWM signal output by X18 is converted to a voltage which appears at node ENA. The voltage of ENA is compared with reference V1 by comparator circuit X17. If the frequency and/or duty cycle of the PWM signal is at the right level to indicate activation of the booster, there will be sufficient voltage generated at node ENA as shown by the waveform 66 in FIG. 9 to enable X17. However, the outputs of comparator circuits X17 and X22 are "or"ed together. So, comparator X17 can not be enabled without comparator X22 being enabled.

Comparator X22 compares the voltage at node SW with reference V1 and thus, is enabled only if there is sufficient voltage on SW (i.e. battery voltage). If the aforementioned two conditions are met, the common output line PRECH of comparators X17 and X22 goes positive via pull up resistor R46, representing the signal which initiates the voltage booster stage 11 activation which occurs at 68 (5–6 ms) as shown in FIG. 11. Activation of the booster circuit is initiated by precharging the power stage supply, which has a heavy capacitive load on it. Precharging of the capacitors of the power stage supply substantially close to the battery source voltage is performed as a practical matter so that when the contacts of the relay 46 (see FIG. 1) are closed a surge of current therethrough will not occur. High currents due to an instantaneous voltage difference across the relay contacts can be destructive to the relay contacts.

Components R55 and C21 simulate the capacitor precharge process. The voltage across capacitor C21 represented by node ISO increases exponentially with charge input as shown by waveform 70 in FIG. 11 (5 . . . 11 ms). A voltage representative of ISO produced by the resistor divider network R54 and R53 is coupled to the +input of a comparator X24 and a voltage representative of the battery voltage SW produced by the resistor divider network R50+R51 and R52 is coupled to the −input thereof. Thus, if the voltage ISO reaches a sufficient level near the battery voltage SW, comparator X24 is enabled and allows the control voltage at node CTRL to increase as shown by the waveform 72 in FIG. 11 (9 ms). Note that the +input of X24 is clamped to the common output of comparators X17 and X22 via diode D5 as a precaution.

More specifically, when X24 is enabled, an average voltage of the PWM signal output of X18 is produced at the node CTRL using a simple two pole RC filter comprising the circuit elements R9, R10, R11, R12, C4, C5, C15, C16. The average voltage is scaled to a certain range by the resistor divider network of R9, R10, and R11. In the embodiment, R10 is connected between the output of X18 and node N2; R9 and C16 are connected in parallel between the SUP bus and node N2; R11 and C4 are connected in parallel between node N2 and battery common; R12 is connected between node N2 and the node CTRL; C15 is connected between node CTRL and the SUP bus; and C5 is connected between node CTRL and battery common.

Node CTRL is coupled to the +input of a comparator X19 and the −input of a comparator X20. The comparators X19 and X20 make up a window comparator circuit referenced to the reference voltages V2 and V3. The window comparator X19,X20 has a common output which is pulled up to the SUP bus by Resistor R41 when enabled. As the voltage of the CTRL node increases through reference levels V3 and V2, a disable DIS pulse is generated by the window comparator X19, X20 as shown by the waveform 74 in FIG. 10 (10 . . . 11 ms). The DIS signal is coupled to the switch drivers (not shown) in order to reset the switch drivers before activation which is a peculiarity of the drivers used in the present embodiment.

The CTRL node is also connected to the +input of another comparator X23 which is referenced to the reference voltage V2. When the voltage of the CTRL node exceeds V2, the output of X23 is enabled or pulled up to the SUP bus through resistor R56 as shown by the waveform 76 in FIG. 11 (11 ms). The output of X23 drives the isolation relay 46 causing closure of its relay contacts which connects the battery source 12 to the booster circuit 11 (FIG. 1). Note that, at this time, the voltage across the isolation relay contacts is sufficiently low. Refer to waveforms 62 and 70 at approximately 11 ms in FIG. 11. Thus, closure of the relay contacts fully energizes the booster power stage 11.

The circuits comprising comparators X8 and X15 produce the PWM signal coupled to the switch drivers for pulsing the switches S1 and S2 in accordance with a duty cycle. In the present embodiment, the circuitry of X15 generates a triangular waveform at node OSC. More specifically, a reference voltage V5 is produced by a resistance divider network R15 and R16 connected between the SUP bus and battery common. Voltage V5 is coupled to the +input of X15. The output of X15 is coupled through resistor R13 back to the −input thereof which is coupled to battery common through a capacitor C6. In addition, positive feedback is provided by the resistor R14 to cause the reference voltage V5 to switch between upper and lower levels as the output of X15 is enabled and disabled through pull up resistor R32.

So, as the SUP bus increases in voltage (FIG. 11, waveform 64), the voltage at node OSC increases commensurately therewith as shown by the waveform 78 in FIG. 9. When the waveform 78 exceeds the upper level of V5, X15 is disabled causing the waveform to decrease in voltage and V5 to switch to the lower level. When the waveform falls below the lower level of V5, X15 is enabled again causing the waveform to increase in voltage and V5 to switch to the upper level. This cycle is repeated to generate the uniform triangular waveform shown at 78 in FIG. 9 at a frequency set R13–R16 and C6.

The CTRL node is also coupled to the +input of another comparator circuit X21 which is used to generate a voltage at node CTRL2 which in turn is compared with the triangular waveform OSC in comparator X8 to generate the PWM signal. The circuitry around X21 looks like a rectifier circuit because of the diode D3, but its purpose is to prevent excessive differential voltage between the inputs of the PWM comparator X8. More specifically, the output node X of X21 is coupled through a pull up resistor R44 to the SUP bus and through the diode D3 to the node CTRL2 which is also coupled to the SUP bus through resistor R42. Node CTRL2 is coupled back to the −input of X21 and to ground through a parallel combination of R43 and C19. Actually, R42 and R43 produce a reference voltage at node CTRL2 which is below, but relatively close to, the voltages of the triangular waveform 78 as shown by waveform 80 in FIG. 9. When the voltage at node CTRL exceeds the voltage at node CTRL2 which occurs around 13 ms, the output X of X21 is enabled as shown by the waveform 82 in FIG. 9. X21 forces the voltage at node CTRL2 to follow substantially the voltage at node CTRL whenever it is greater than the reference voltage defined by R42 and R43.

As the voltage at CTRL2 intersects the triangular waveform, X8 begins to generate the PWM output via pull up resistor R17 as shown by pulse train waveform 84 starting at about 16 ms in FIG. 10. Diode D2 links the rectangular output of X8 with the pulsed output of X15 in such a way that a predetermined PWM duty cycle, like 50%, for example, is never exceeded. This phenomenon is shown in the waveform 84 by the small pedestal preceding each pulse which is clamped to the voltage across diode D2 when the output of X15 is pulled "low". The thin negative spikes on the PWM signal shown in FIG. 10 which are always present after activation (>3 ms) are more a product of the simulation than really present in the circuit, they indicate the effect of D2's parasitic capacitance. Table 1 below provides exemplary values of the circuit components used in the present simulation embodiment as well as model numbers for the integrated circuits.

TABLE 1

COMPONENT VALUES FOR SIMULATION CIRCUIT (FIG. 8)

| R1 | 10K | R30 | 4.7K | | |
|---|---|---|---|---|---|
| R2 | 2.2K | R32 | 4.7K | | |
| R3 | 220K | R33 | 10K | | |
| R4 | 1K | R34 | 10K | | |
| R6 | 6.8K | R35 | 470 | C1 | .001 μF |
| R7 | 330K | R36 | 10K | C2 | .010 μF |
| R8 | 3.9K | R37 | 10K | C3 | .001 μF |
| R9 | 56K | R38 | 1K | C4 | .047 μF |
| R10 | 100K | R39 | 1K | C5 | .047 μF |
| R11 | 47K | R40 | 3.9K | C6 | .012 μF |
| R12 | 20K | R41 | 4.7K | C15 | .047 μF |
| R13 | 100K | R42 | 100K | C16 | .047 μF |
| R14 | 100K | R43 | 47K | C17 | .010 μF |
| R15 | 48K | R44 | 33K | C18 | .010 μF |
| R16 | 48K | R45 | 10K | C19 | .010 μF |
| R17 | 4.7K | R46 | 10K | C21 | 010 μF |
| | | R50 | 18K | | |
| Q1 | BC557C | R51 | 4.7K | | |
| Q2 | BC546 | R53 | 4.7K | X8 | LM311 |
| Q3 | BC328 | R53 | 22K | X15 | LM311 |
| Q4 | BC338 | R54 | 100K | X16 | LM339A |
| | | R55 | 100 | X17, X22, X24 | LM339A |
| D1 | IN4148 | R56 | 10K | X21 | LM311 |
| D2 | IN4148 | | | X19, X20, X23 | LM339A |
| D3 | IN4148 | | | | |
| D4 | IN759 (Z) | | | | |
| D5 | P44148 | | | | |

In the present embodiment, once the input PWM signal IN becomes invalid, a low voltage limit is violated, or an unexpected voltage drop across the relay contacts appears, CTRL will be blocked or pulled low, thus disabling the signal PWM via X21 and relay 46 via X23 immediately. With relay 46 disabled, the booster circuit 11 is deactivated, i.e. without power. Also, in the present simulation embodiment, the duty cycle of input PWM signal at node IN received from controller 14 is a measure of the motor drive signal generated by the power stage(s) thereof or a voltage increase requested by the controller 14. When the duty cycle at node IN exceeds a predetermined level as set by X21, the booster circuit operates in a mode in which the duty cycle of the PWM switch control (PWM) is permitted to vary along with the measured duty cycle value of signal IN (CTRL). If the signal IN remains below the predetermined level, the booster circuit may operate in the transparent bypass mode as described herein above.

However, it is understood that the voltage booster circuit 11 is also operative in the constant voltage increase mode in which the duty cycle of switch control PWM is fixed to a predetermined value, like 33.3%, for example, to produce a constant voltage increase at the booster circuit of approximately 50%. This fixed duty cycle in switch control could be rendered operative when the drive signal is within a range of its maximum value. For example, when the duty cycle at node IN becomes within, say 80% of a 100% duty cycle, for example, the fixed PWM switch control could be activated. This mode of operation could be accomplished by a modification to the circuitry of X21. That is, instead of allowing the voltage intersecting the triangular waveform at X8 to vary when CTRL exceeds a predetermined level, it can be generated as a fixed voltage intersecting the triangular waveform at a level to produce a fixed duty cycle at the node PWM for switch control. In fact, the mode control 32 may include both such circuits and chose which one to use based on a determined mode of operation.

As noted above in connection with the embodiment of FIG. 6, the charge ripple on capacitor C of the booster circuit 11 can be smoothed by multiphase interleaving of charge input from a plurality of complementarily switched circuits. This may be accomplished in the present embodiment, by producing triangular waveforms separated in phase. Thus, a common reference voltage will intersect the waveforms at different phases to produce switch control PWM pulse trains in the same phase relationship with each other. The phased apart pulse trains control correspondingly the plurality of switched circuits to produce interleaved pulsed charge waveforms as exemplified by FIGS. 7A–7C. A suitable embodiment of a circuit to generate three phased apart triangular waveforms for use in producing the interleaving switch control PWM signals is shown by way of example in FIG. 12.

Figure 12:
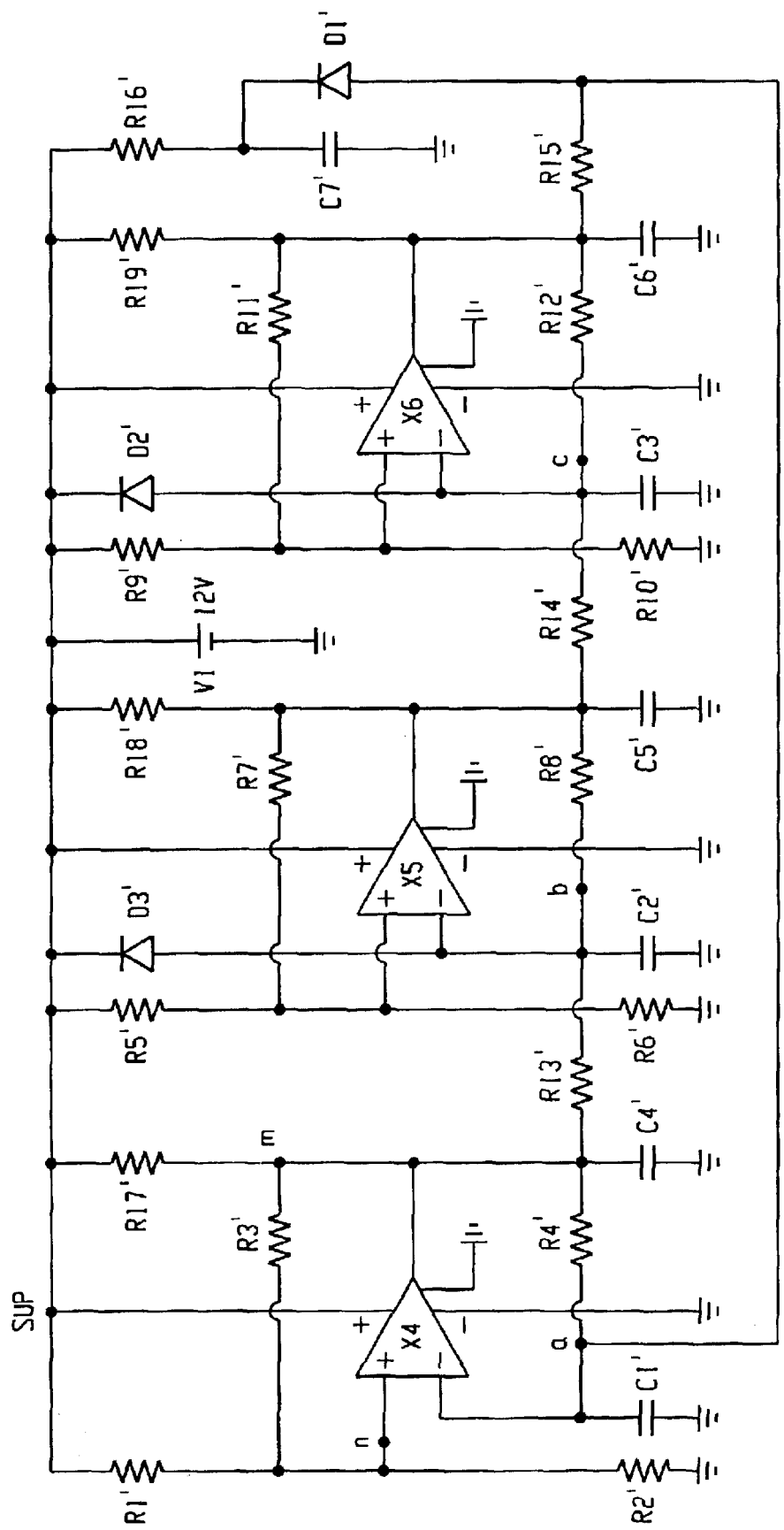
FIG. 12 is a circuit schematic of multiphase triangular waveform generator suitable for simulation of the embodiment of FIG. 1.
Figure 13:
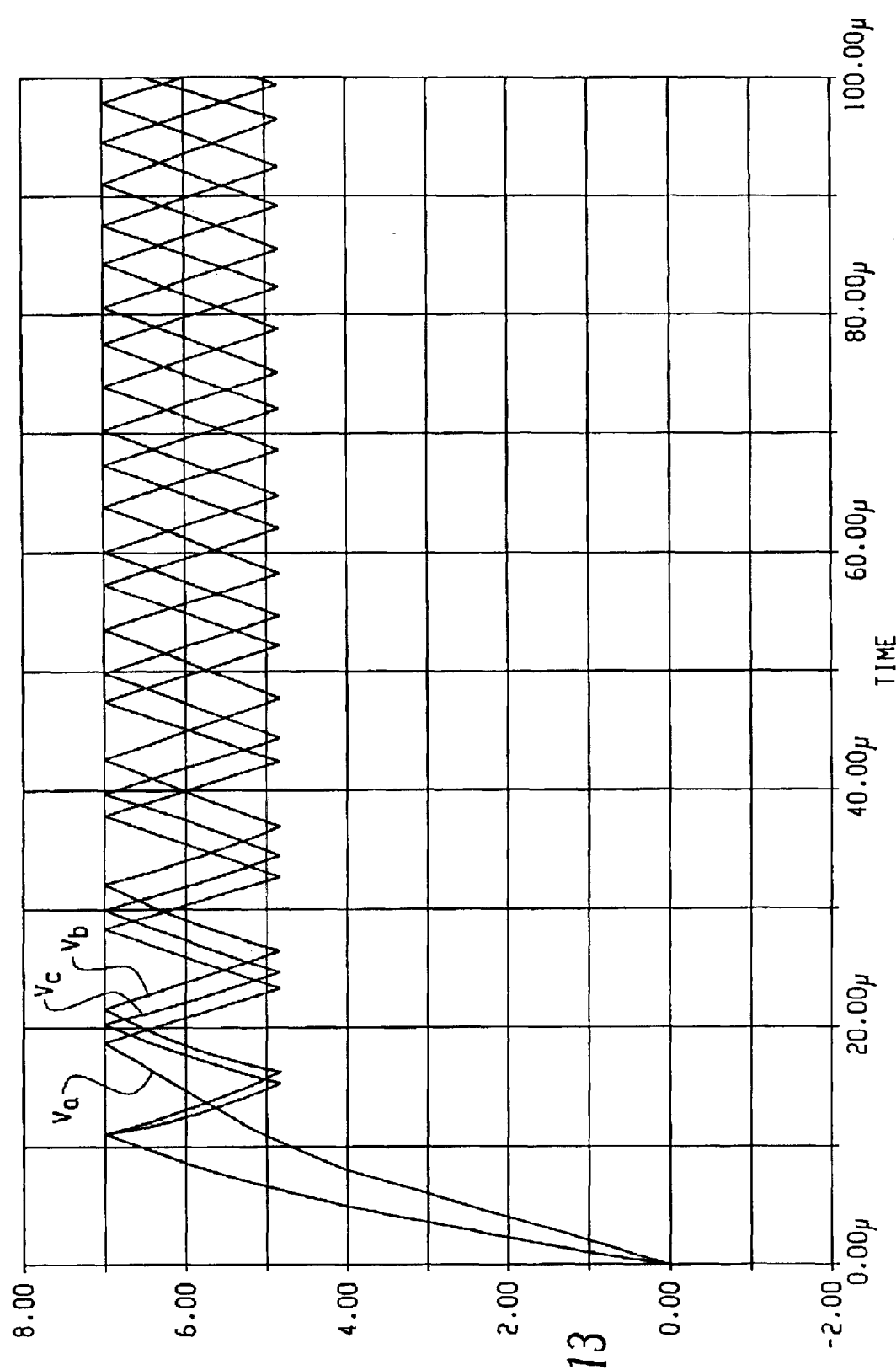
FIG. 13 are simulated time waveforms of the multiphase triangular waveforms produced by the simulation circuit of FIG. 12.

The circuit embodiment of FIG. 12 includes three interconnected circuits surrounding comparators X4, X5, and X6, respectively, which are all substantially the same as that described for the triangular waveform generator X15 in the embodiment of FIG. 8. The three phased apart voltage waveforms, Va, Vb, and Vc, which are illustrated in the time graph of FIG. 13, are generated at the nodes a, b and c, respectively. In the present embodiment, the outputs of the comparators X4, X5 and X6 are coupled to battery common through capacitors C4', C5' and C6', respectively. Also, interconnection of the three circuits is accomplished in the present embodiment by coupling the output of X4 to node b of the X5 circuit through resistor R13'; coupling the output of X5 to node c of the X6 circuit through resistor R14'; and coupling the output of X6 to node a of the X4 circuit through resistor R15'. Each of the nodes a, b and c are clamped to the SUP bus by diodes D1', D3' and D2', respectively. For simulation purposes, D1, R16 and C7 form a network which delays the rise time of X4 on startup. D2 and D3 account for the additional capacitance of D1, keeping symmetry. Typical values for the circuit components of the embodiment of FIG. 12 are provide in Table 2 below.

TABLE 2

COMPONENT VALUES FOR 3-PHASE TRIANGULAR WAVE GEN. (FIG. 12)

| R1' | 48K | C1' | 120 pF |
|---|---|---|---|
| R2' | 48K | C2' | 120 pF |
| R3' | 100K | C3' | 120 pF |
| R4' | 100K | C4' | 10 pF |
| R5' | 48K | C5' | 10 pF |
| R6' | 48K | C6' | 10 pF |
| R7' | 100K | C7' | 100 pF |
| R8' | 100K | | |
| R9' | 48K | D1', D2', D3' | IN4148 |
| R10' | 48K | X4, X5, X6 | LM311 |
| R11' | 100K | | |
| R12' | 100K | | |
| R13' | 1 M | | |
| R14' | 1 M | | |
| R15' | 1 M | | |
| R16' | 1 M | | |
| R17' | 10K | | |
| R18' | 10K | | |
| R19' | 10K | | |

Figure 14A:
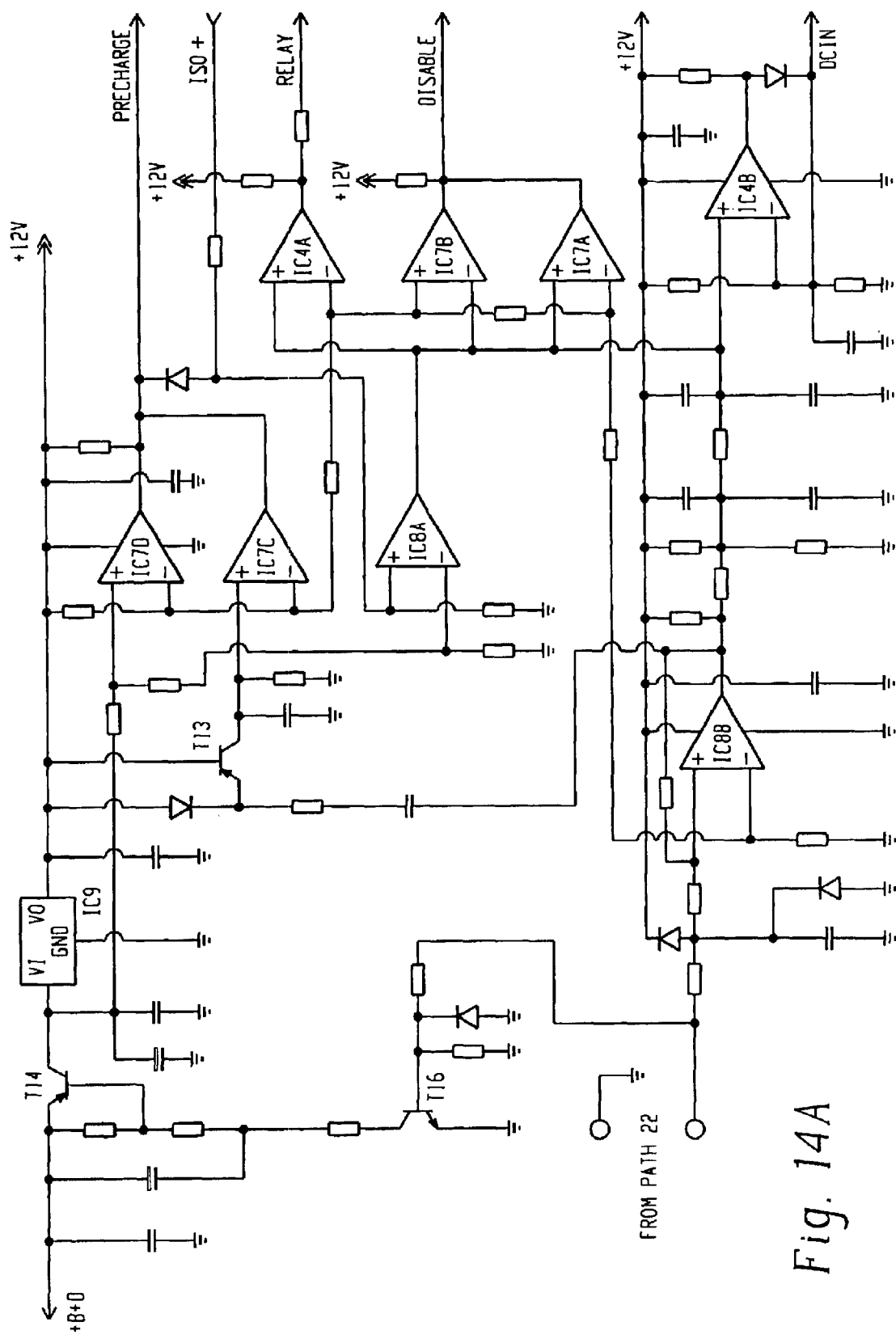
FIGS. 14A, 14B and 14C taken together depict a circuit schematic of a motor controller suitable for embodying the principles of the present invention.
Figure 14B:
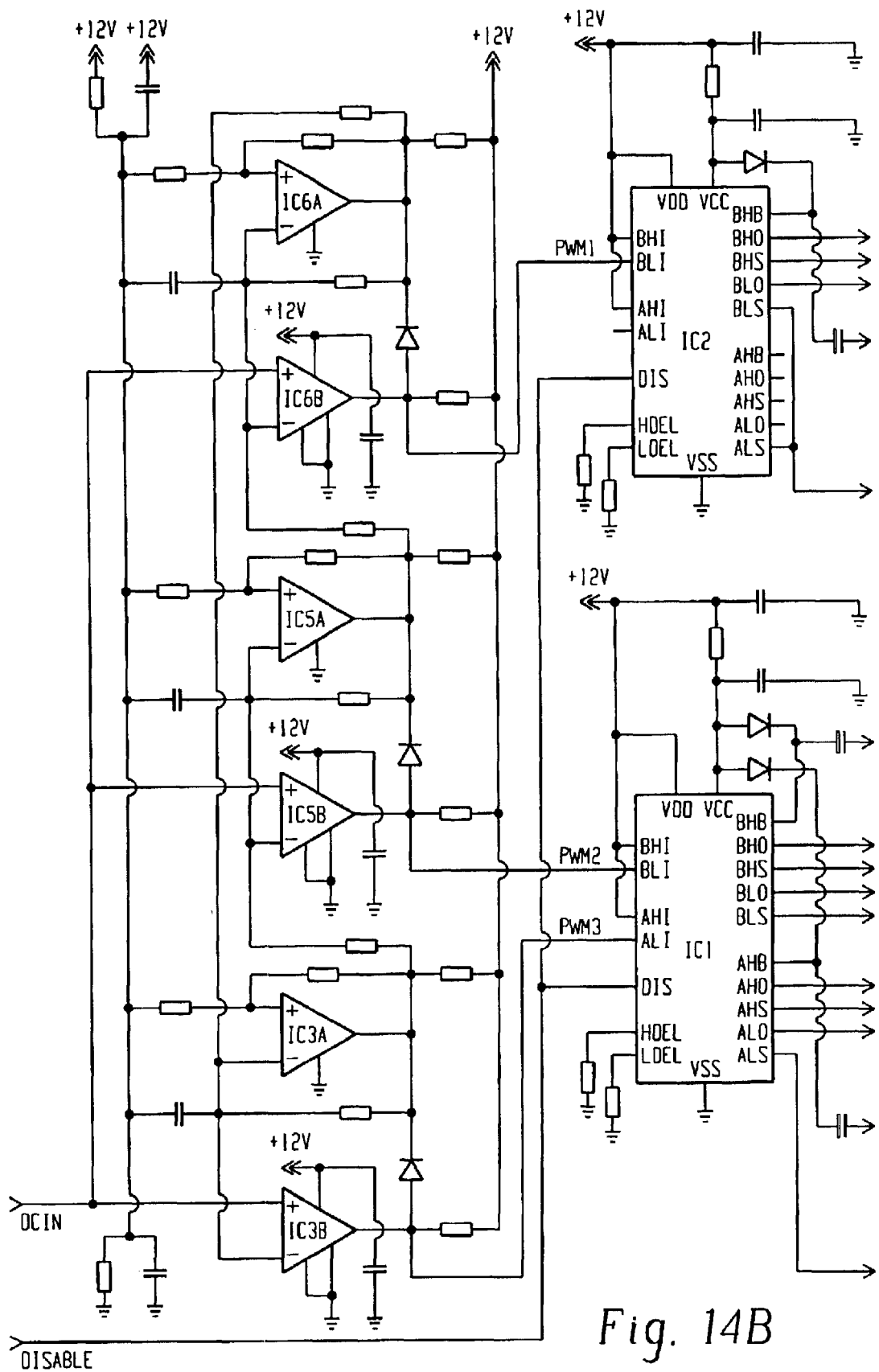
Figure 14C:
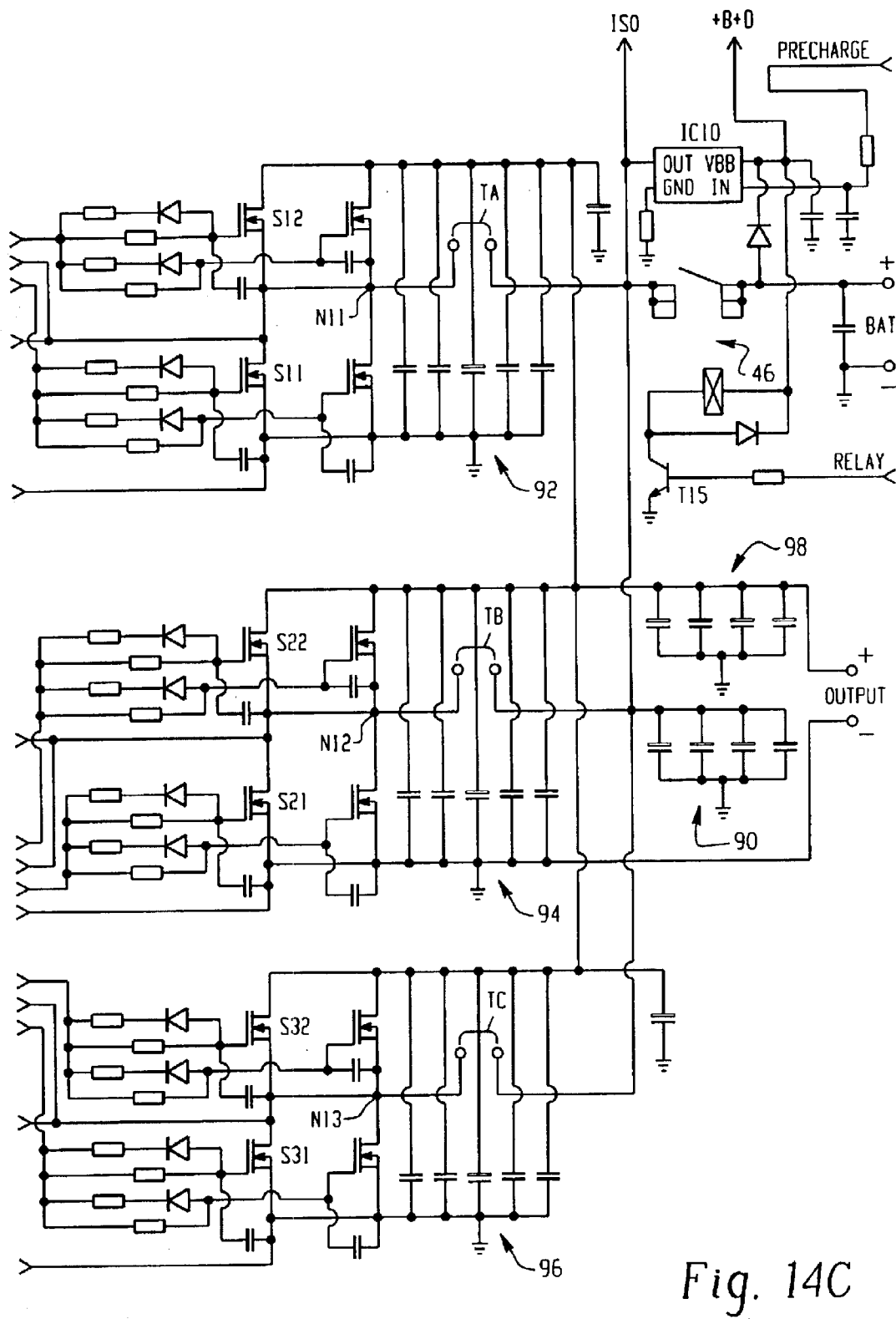

FIGS. 14A, 14B and 14C together illustrate a circuit schematic of an actual embodiment of the motor controller 10 having a control portion 32 which is substantially the same as described in connection with the simulation embodiment of FIG. 8 except that the actual embodiment includes the generation of three phased apart switch control PWM pulse trains, PWM1, PWM2, and PWM3 as described in connection with the simulation embodiment of FIG. 12.

The small rectangular blocks in FIGS. 14A–14C represent resistive elements. Referring to FIG. 14A, a signal representative of the PWM drive signal or the desired voltage increase may be conducted to motor controller 10 over path 22. The circuits of T16 and T14 are the same as described for circuits Q2 and Q3 for detecting the presence of the drive control signal and connecting the battery voltage to the control circuit. The circuit IC9 is a commercial integrated circuit voltage regulator which replaces the circuit of Q4/D4 of the simulation. Capacitors are coupled between the voltage supplies and battery common on both sides of IC9 for reducing ripple on the supply buses.

Circuitry of T13 is the same as that described for Q1 and the circuits of IC7D and IC7C are comparable to the circuits of X22 and X17 which produce the precharge signal. The circuitry of IC8A which is similar to the circuitry of X24 establishes that the voltage across the contacts of relay 46 is within the permitted range to close the contacts of the relay. The comparator IC4A activates the relay and comparators IC7A and IC7B form the window comparator for generating the gate driver reset pulse DISABL. The circuitry of IC8B is the same as that for X18 and the following two pole filter circuit is the same as described for the simulation. Also, the circuit of IC4B is the same as the circuit for X21 which produces a reference signal DCI for intersecting the the three phase triangular waveforms to produce the three phased apart switch control PWM pulse trains.

Referring to FIG. 14B, the circuits of IC6A, IC5A and IC3A are the same as described for the simulation circuit of FIG. 12 for producing the three phased apart triangular waveforms as exemplified in FIG. 13. The waveforms generated by IC6A, IC5A and IC3A are compared with signal DCI in circuits IC6B, IC5B and IC3B to produce the phased apart switch control signals PWM1, PWM2 and PWM3, respectively, much the same way as described for X8 in the simulation embodiment. The switch control signals PWM1, PWM2 and PWM3 are coupled to the inputs of corresponding gate drivers in integrated circuits IC1 and IC2 which may be of the type bearing model number HIP4081 which in turn are coupled to three corresponding sets of MOSFET type switches S11 and S12, S21 and S22, and S31 and S32 as shown in FIG. 14C. It is understood that more powerful gate drivers may be added between the HIP4081 drivers and the MOSFET switches to supplemental the driving power of the HIP4081 drivers. Alternatively, one three-channel HIP4086 IC gate driver can be used instead of the two HIP4081 integrated circuits as shown in FIG. 14B. Also, additional and more powerful gate drivers may be used when driving large MOSFETs.

In the present embodiment, the gate drivers are adjusted properly by the circuitry shown in FIG. 14C for the floating voltages of nodes N11, N12 and N13 much the same way as that described for the embodiment of FIG. 5 herein above. Also, as shown in FIG. 14C, the embodiment includes two MOSFET switches connected in parallel and driven together for each switch S11, S12, S21, S22, S31 and S32 to handle the particular current capacity of the exemplary embodiment.

Still referring to FIG. 14C, the precharge signal is coupled to an integrated switch IC10 which includes a form of current limitation for charging the capacitor bank shown at 90 which is connected to the other side of the contact of relay 46. The signal ISO is provided to the control circuit of FIG. 14A as a measure of the voltage across the capacitor bank. The RELAY signal drives relay 46 through the circuitry of T15. When the contact(s) of relay 46 are closed, the battery source is connected to the booster circuit 11 which is similar to the embodiment described in connection with FIG. 6.

External power inductors which may be on the order of 8 microhenries, for example, are connected to the circuitry at terminals TA, TB and TC between the battery source and nodes N11, N12 and N13, respectively. MOSFET switches S11, S21 and S31 are coupled respectively between nodes N11, N12 and N13 and battery common and MOSFET switches S12, S22 and S32 are coupled respectively between nodes N11, N12 and N13 and common capacitance C comprising parallel connected capacitor banks 92, 94, 96 and 98. The voltage generated across the common capacitance is supplied to the power stages 28,30 to generate the drive signal(s) 34, 36 as shown in FIG. 1.

While the foregoing described embodiments utilize discrete circuit elements, it is understood that alternatively, the control circuitry may be embodied in a programmed microprocessor-based controller having a CPU, memory, and inputs and outputs including PWM outputs. Using microprocessor systems for drive control units is already being practiced by the assignee of the instant application.

In a still further embodiment, the control 42 of the controller 14 as shown in FIG. 1 may be operative to control the motor(s) 16,18 in a speed control loop. In this embodiment, the control 42 would monitor the speed of the vehicle directly or compute the speed of the vehicle from the speed of the motor and control the power control stage 28,30 to generate a drive signal 34, 36 to operate the vehicle at a desired speed. One such drive controller is, for example, the MKIV and the MKIVGB controllers manufactured by the assignee of the instant application. A signal may be communicated from control 42 to the mode controller 32 over path 22, for example, so that the mode controller 32 may control the operating mode of the booster circuit 11 based on whether or not the drive signal is sufficient to operate the vehicle at the desired speed.

When controlled in the transparent bypass mode, the booster 11 provides a voltage to the power stage 28,30 that is matching or less than the voltage of the battery source. In this mode, the power control stage 28,30 is capable of producing a drive signal up to a maximum level, which is limited by the battery voltage, to control the motor to operate the vehicle at the desired speed or a certain maximum speed. The mode control 32 may sense as described herein above that the drive signal is nearing its maximum and thus insufficient to operate the vehicle at the desired speed, and control the voltage booster circuit 11 between modes which can increase the voltage supply to the power control stage.

However, if the control 42 determines that the current of the drive signal is greater than a predetermined level, it may send a signal over path 22, for example, to inhibit the mode control circuit from altering the mode of operation of the booster circuit 11. Alternatively, it may withhold the signal representative of the drive signal from the mode control 32 in which case, the mode control 32 would have no basis for altering the operational mode of the booster circuit. Additional protective circuits may be added such as, for example, to the booster or controller circuit to measure currents, temperatures and/or over-voltage directly.

Accordingly, the multi-mode motor controller 10 offers: improved matching of load to power supply, enhanced dynamics range for the power controller, negligible impact on efficiency, drive comfort and other key parameters, in particular while using the transparent bypass mode, and add-on solution, compatible with existing drive power control devices.

While the present invention has been described herein above in connection with a number of different embodiments, it is understood that the invention should not be limited in any way, shape or form by any single embodiment. Rather, the present invention should be construed in breadth and broad scope in accordance with the recitation of the claims appended hereto.

What is claimed is:

1. An electric motor drive controller for an electric vehicle driven by a motor with permanent excitation and powered by an energy source, said motor drive controller comprising:
a power control stage coupleable to said motor for generating a drive signal at a voltage to control said motor at a desired speed;
a voltage control circuit connectable between said energy source and said power control stage for controlling the voltage of said drive signal at a first voltage potential in one operating mode and at a voltage potential greater than the first voltage potential in another operating mode; and
a mode controller for controlling the operating modes of said voltage control circuit based on properties of said drive signal.

2. The motor drive controller of claim 1 wherein the power control stage is capable of generating a maximum drive signal at the first voltage potential to control the motor at the desired speed; and wherein the mode controller includes a sensing circuit for monitoring the drive signal; and a mode control circuit governed by said sensing circuit to control the voltage control circuit between operating modes when the drive signal is determined to be within a predetermined range of the maximum drive signal.

3. The motor drive controller of claim 2 wherein the power control stage includes means for generating the drive signal as a pulse width modulated (PWM) signal at the voltage controlled by the voltage control circuit, the duty cycle of said PWM drive signal being a measure thereof; and wherein the sensing circuit is operative to monitor the duty cycle of said PWM drive signal to determine when it is within the predetermined range of the maximum drive signal and govern the mode control circuit to control the voltage control circuit between operating modes.

4. The motor drive controller of claim 1 wherein the voltage control circuit includes means for passing current bidirectionally between the energy source and the power control stage.

5. The motor drive controller of claim 1 wherein the voltage control circuit comprises;
a first energy storage element connectable in series with the energy source;
a switch element coupled between the first energy storage element and the energy source and operative in open and closed states, when operated in said closed state, said switch element coupling said first storage element across the energy source;
a second energy storage element connectable in parallel with the energy source; and
a circuit element coupled between said first and second energy storage elements and operative to pass energy from said first energy storage element to said second energy storage element to generate a voltage potential across said second storage element which controls the voltage of the drive signal.

6. The motor drive controller of claim 5 wherein the first energy storage element comprises an inductor element; wherein the second energy storage element comprises a capacitor element; and wherein the mode controller is operative between operating modes to pulse the switch element between open and closed states at a variable duty cycle.

7. The motor drive controller of claim 5 wherein the circuit element comprises a diode element connected anode to cathode from the first energy storage circuit element to the second energy storage circuit element; wherein the switch element is operated by the mode controller to remain in the open state in the one operating mode and to be pulsed between the open and closed states between operating modes; and wherein the voltage potential across the second energy storage element in the one operating mode is less than the energy source voltage and in the other operating mode is greater than the energy source voltage.

8. The motor drive controller of claim 7 wherein the switch element is operated by the mode controller to be duty cycle pulsed between the open and closed states between operating modes; and wherein the duty cycle sets the voltage potential across the second energy storage element.

9. The motor drive controller of claim 5 wherein the circuit element comprises a second switch element operative in open and closed states; said second switch element operative in the closed state to pass energy of the first energy storage element to the second energy storage element; wherein the switch element and second switch element are operated by the mode controller to be pulsed complementarily between the open and closed states between operating modes; and wherein the voltage potential across the second energy storage element in the one operating mode is less than the energy source voltage and in the other operating mode is greater than the energy source voltage.

10. The motor drive controller of claim 9 wherein the switch element and second switch element are operated by the mode controller to be duty cycle pulsed complementarily between the open and closed states between operating modes; and wherein the duty cycle sets the voltage potential across the second energy storage element.

11. The motor drive controller of claim 10 wherein the switch element and second switch element are operated by the mode controller in the other operating modes to be duty cycle pulsed complementarily at a fixed duty cycle.

12. The motor drive controller of claim 10 wherein the switch element and second switch element are operated by the mode controller between operating modes to be duty cycle pulsed complementarily at a variable duty cycle.

13. The motor drive controller of claim 1 wherein the voltage control circuit includes a multiphase converter circuit comprising;
a plurality of first energy storage elements, each said first energy storage element connectable in series with the energy source;
a corresponding plurality of first switch elements, each first switch element coupled between a corresponding first energy storage element and the energy source, each first switch element operative in open and closed states in phase relationship to said other first switch elements of said plurality, when operated in said closed state, each first switch element coupling its corresponding first storage element across the energy source;
a common energy storage element connectable in parallel with the energy source; and
a corresponding plurality of second switch elements, each second switch element coupled between its corresponding first energy storage element and said common energy storage element, each second switch element operative in open and closed states in phase relationship to said other second switch elements of said plurality to pass energy from its corresponding first energy storage element to said common energy storage element to generate a voltage potential across said common storage element which controls the voltage of the drive signal.

14. The motor drive controller of claim 1 wherein the motor is controlled by a speed control loop that controls the power control stage to generate a drive signal to maintain the vehicle at a desired speed; and wherein the mode controller includes means for controlling the operating mode of the voltage control circuit based on whether or not the drive signal is sufficient to operate the vehicle at the desired speed.

15. The motor drive controller of claim 14 wherein the power control stage is capable of generating a maximum drive signal at the first voltage potential to control the motor to operate the vehicle at the desired speed; and wherein the mode controller includes a sensing circuit for monitoring the drive signal; and a mode control circuit governed by said sensing circuit to control the voltage control circuit between operating modes when the drive signal is determined to be insufficient to operate the vehicle at the desired speed.

16. The motor drive controller of claim 15 wherein the power control stage includes means for generating the drive signal as a pulse width modulated (PWM) signal at the voltage controlled by the voltage control circuit, the duty cycle of said PWM drive signal being a measure thereof; and wherein the sensing circuit is operative to monitor the duty cycle of said PWM drive signal to determine when it is insufficient to operate the vehicle at the desired speed and govern the mode control circuit to control the voltage control circuit between operating modes.

17. The motor drive controller of claim 14 including an inhibit circuit for inhibiting the mode control circuit from controlling the voltage control circuit between operating modes when current of the drive signal is determined to be greater than a predetermined level.

18. A motor drive control system for an electric vehicle driven by an electric motor powered by an energy source, said system comprising:
   a power control stage coupleable to said motor for generating a drive signal at a voltage to control said motor at a desired speed;
   a first motor drive controller connectable between the energy source and said power control stage for controlling the voltage of said drive signal at a first voltage potential, said first motor drive controller operative to monitor the properties of said drive signal; and
   a second motor drive controller connectable between the energy source and said power control stage for controlling the voltage of said drive signal at a second voltage potential in one operating mode and at a voltage potential greater than the second voltage potential in another operating mode, said second motor drive controller including a mode controller for communicating with said first motor drive controller to determine the properties of said drive signal and for controlling the operating modes of said second motor drive controller based on said communicated properties of said drive signal.

19. The motor drive control system of claim 18 including means governed by said mode controller for connecting said second motor drive controller between the energy source and the power control stage based on the communicated properties of said drive signal.

20. A motor drive control system for an electric vehicle driven by an electric motor powered by an energy source, said system comprising:
   a power control stage coupleable to said motor for generating a drive signal at a voltage to control said motor at a desired speed;
   a first motor drive controller connectable between the energy source and said power control stage for controlling the voltage of said drive signal at a first voltage potential;
   a second motor drive controller connected, when activated, between the energy source and said power control stage for controlling the voltage of said drive signal at a second voltage potential in one operating mode and at a voltage potential greater than the second voltage potential in another operating mode, said second motor drive controller including a mode controller for controlling the operating modes of said second motor drive controller; and
   said first motor drive controller including means for monitoring the activation status of said second motor drive controller; and means governed by said monitoring means for connecting the first motor drive controller between the energy source and said power control stage based on the monitored activation status of the second motor drive controller.

* * * * *